United States Patent [19]
Ganesan

[11] Patent Number: 5,850,448
[45] Date of Patent: Dec. 15, 1998

[54] PROGRAMMED COMPUTER FOR GENERATING PRONOUNCEABLE SECURITY PASSWORDS

[75] Inventor: Ravi Ganesan, Arlington, Va.

[73] Assignee: Bell Atlantic Network Services, Inc., Arlington, Va.

[21] Appl. No.: 731,427

[22] Filed: Oct. 15, 1996

Related U.S. Application Data

[63] Continuation-in-part of Ser. No. 328,226, Oct. 25, 1994, Pat. No. 5,588,056.

[51] Int. Cl.$^6$ ....................................................... H04L 9/00
[52] U.S. Cl. .................................... 380/25; 380/4; 380/44
[58] Field of Search ............................... 380/1, 2, 23, 25, 380/4, 44

[56] References Cited

U.S. PATENT DOCUMENTS

| | | | |
|---|---|---|---|
| 4,440,976 | 4/1984 | Bocci et al. ................................. | 380/1 |
| 4,926,475 | 5/1990 | Spiotta et al. ............................... | 380/2 |
| 4,974,191 | 11/1990 | Amirghodsi et al. ........................ | 380/1 |
| 5,199,069 | 3/1993 | Barrett et al. ............................... | 380/2 |
| 5,307,409 | 4/1994 | Driscoll ........................................ | 380/2 |
| 5,394,471 | 2/1995 | Ganesan et al. ........................... | 380/25 |
| 5,588,656 | 12/1996 | Ganesan .................................... | 380/25 |

OTHER PUBLICATIONS

Kohl, John et al., The Kerberos™ Network Authentication Service (V5), Internet–Draft, Sep. 1, 1992, pp. 1–69.
Spafford, Eugene H., "Observing Reusable Password Choices", Jul. 31, 1992, pp. 1–12.
Spafford, Eugene H., "OPUS: Preventing Weak Password Choices", Jun. 1991, pp. 1–14.
Federal Register, vol. 57, No. 174, Tuesday, Sep. 8, 1992, Notices, pp. 40895–40896.
Smid, Miles E. et al., "The Data Encryption Standard: Past and Future", *Proceedings of the IEEE,* vol. 76, No. 5, May 1988, pp. 550–559.
Nagle, John, "Tell if a Password is Obvious", vol. 16, Issue 60, Nov. 10, 1988.
Bellovin, Steven M. et al., "Encrypted Key Exchange: Password–Based Protocols Secure Against Dictionary Attacks", *IEEE,* 1992, pp. 72–84.
Bishop, Matt, "Proactive Password Checking", pp. 1–9.
Ganesan, Ravi et al., "Statistical Techniques for Language Recognition: An Empirical Study Using Real and Simulated English", Sep. 28, 1993, pp. 1–48.

(List continued on next page.)

*Primary Examiner*—Salvatore Cangialosi
*Attorney, Agent, or Firm*—McDermott, Will & Emery

[57] ABSTRACT

A programmed computer for forming a pronounceable security password, includes storage medium having a plurality of first and second word segment portions stored thereon. Each second word segment portion is within one or more sets of second word segment portions, each set being associated with one first word segment portion. Each second word segment portion within a particular set is different from others within the set and is combinable with the associated first word segment portion to form a pronounceable word segment. A plurality of transition numbers each associated with one or more of the first word segment portions and corresponding to the number of said second word segment portions within the associate set of second word segment portions are also stored on the storage medium. The computer includes a processor programmed to select a first word segment portion and a second word segment portion from its associated set of second word segment portions. Selection of any one of the first word segment portions and any one of the second word segment portions within the associated set is of substantially equal probability. The processor combines the selected first and second word segment portions to form a first pronounceable word segment and determines if consecutive characters thereof are unacceptable based upon their correspondence to those of the first word segment portions having a transition number less than a threshold. If acceptable a pronounceable security password of eight or more characters is generated so as to include the first pronounceable word segment.

40 Claims, 10 Drawing Sheets

OTHER PUBLICATIONS

Feldmeier, David C. et al., "UNIX Password Security—Ten Years Later", pp. 44–63.

Ganesan, Ravi et al., "Statistical Techniques for Language Recognition: An Introduction and Guide for Cryptoanalysts", *Computer Science Technical Report Series,* Feb. 1993, pp. 1–32. Supplement, Sep. 28, 1993, pp. 49–129.

PROGRAMMED COMPUTER FOR GENERATING PRONOUNCEABLE SECURITY PASSWORDS

RELATED APPLICATIONS

This application is a continuation-in-part of application Ser. No. 08/328,226, filed Oct. 25, 1994, now U.S. Pat. No. 5,586,056.

BACKGROUND OF INVENTION

1. Field of the Invention

This invention relates to security passwords and more particularly to a computer and computer programming for generating secure pronounceable passwords.

2. Description of the Related Art

Poorly chosen passwords continue to be a major cause of security breaches. The increasing popularity of such products as the Unix Operating System and the Kerberos Authentication Protocol in commercial environments accentuate this problem, as both are vulnerable to security breaches by dictionary attacks which search for poor passwords.

Given the choice, most users choose passwords from a "likely password" key space, $K_1$, that is a small fraction of the entire key space, K, available to them. This smaller key space is typically composed of bad passwords and bad noisy passwords. Bad passwords are those chosen from natural language, jargon, acronyms, dates, or other numeric series, and/or derivatives thereof. Bad noisy passwords consist of a bad password plus noise (e.g. tiger2 or computer). The small size of $K_1$, facilitates breaches of security through exhaustive searches of the "likely password" key space, which can be performed using conventional techniques and technologies that are well known in the art. For instance, in the Unix operating system (see Morris, R. and K. Thompson. "Password security: A case history", Communications of the ACM, 22(11), November 1979), user passwords are transformed using a one way function based upon the data encryption standard (DES) (see Data Encryption Standard, National Bureau of Standards, Federal Information Processing Standards, Publication No. 46-1 (Jan. 15, 1977)), and then stored in a password file that is usually accessible to a number of individuals and is in all cases accessible to the administrators of the system to which the password provides access. As the one way function itself is not secret, an adversary can methodically apply this function to all words in $K_1$, and then compare the results to those in the password file. The Kerberos Authentication Protocol (see Kohl, J. C. Neuman and J. Steiner, "The Kerberos Network Authentication Service", MIT Project Athena (Oct. 8, 1990) Version 5, Draft 3), is also vulnerable to such dictionary attacks as, for reasons not relevant here, the protocol makes it possible for an adversary having a user password to request server access to encrypted messages. Further, by eavesdropping on the network, the adversary can also obtain additional encrypted messages which can be decrypted using the same exhaustive key search technique on $K_1$.

The size of the key space that can be searched efficiently by an adversary is much larger than is usually believed by most users. Karn and Feldmeier have discussed the size of the key space that can be searched using conventional techniques and technology. (See Karn, P. R. and D. C. Feldmeier, "UNIX password security—Ten years later", Advances in Cryptology—CRYPTO '89, G. Brassard (Ed.) Lecture Notes in Computer Science, Springer Verlag, 1990). Although this discussion is directed towards UNIX password security, the Karn and Feldmeier analysis is widely applicable to typical systems which have artificially small password key space and are therefore susceptible to a key search attack. Protection against such attacks can be enhanced by either altering the system itself, for instance, as proposed by Bellovin and Merritt to secure Kerberos (see Bellovin, S. and M. Merritt, "Encrypted Key Exchange" IEEE Computer Society Symposium on Security and Privacy, May 1992, Oakland, Calif.) or enlarging the size of the likely password key space $K_1$ until it approaches the size of K, where K is very large. Another approach to improving password security is to establish a system to select a random password of key space K for the user. This later approach, however, can be particularly unfriendly to the user and can lead to users maintaining a written ledger of their passwords to avoid having to memorize a long and arbitrarily selected password.

As noted above, attackers typically attack passwords using dictionary attacks. Either (i) by eavesdropping on the network or (ii) by requesting from a security server, e.g. in the Kerberos (KOHL90) system, or from a file on a system, the attacker can obtain several strings each of which represents known plaintext encrypted with user passwords, e.g. in UNIX a string of zeroes is encrypted with the user password. The attacker then attempts to decrypt these strings by methodically trying passwords from a dictionary of commonly used passwords, and obtain the original plaintext. A related approach which uses less time (but more space) is to pre-compute the encryption of all the passwords in the dictionary, so once the strings are obtained, a simple look up is all that is needed to obtain the user password.

There are at least three approaches to solving the problem of poorly chosen user passwords, and each has its field of use. First, smart cards or token authenticators can be used to completely replace the password. Second, proactive password checkers which examine passwords and do not allow bad passwords to be utilized can be used. Finally, a password generator can be used by the system to generate secure passwords for the users.

Recently, an improved technique for proactive password checking has been described in U.S. patent application Ser. No. 08/121,852, filed Sep. 17, 1993, entitled Method and System for Proactive Password Validation, (Attorney Docket No. 680-072), which is also assigned to the assignee of all rights in the present application. As described the technique provides a proactive password validation method and system which will protect against the selection of bad passwords belonging to a dictionary of bad passwords as well as bad noisy passwords. The on-line generation of bad noisy passwords is not required. The technique does not require the storage of a dictionary of bad passwords or large amounts of data, and can easily be installed in a distributed computing environment. Utilizing the technique, password validation can be performed quickly. After defining the bad password characteristics off-line, the actual validation of the proposed password can be performed on-line, in real time, using minimal amounts of computing power.

With respect to password generators, there are two types of such generators which are known in the art. One type generates completely random passwords which are, by definition, guaranteed to be "good". This type of generator has, however, the significant disadvantage of making the password unpronounceable, and thus hard to remember, and more likely to be written down, which has a security cost, or forgotten, which has an administrative cost.

The second type generates a random, yet pronounceable password for the user, on the assumption that a pronounceable password is easier to memorize, and consequently less likely to be written down or forgotten, and hence, more user friendly and secure. This type of generator typically works by combining random character generation with the rules for pronunciation to generate strings which are pronounceable. There are at least two important aspects to such a generator. First, the passwords must be pronounceable. Since the so called "rules" of pronunciation are fairly inexact, this is a somewhat subjective issue. Secondly, the generated password must be secure. Several pronounceable password generators have been designed, perhaps the two most prominent being that developed by Morrie Gasser [GASS77] in 1977, which is being adopted as a standard by NIST [FIPS92], and that developed by IBM and used by Sandia Labs.

Turning now to attacks on system security, the object of an attacker is either to break into any account(s) on the system or break into a particular account on the system. The former is the more typical vulnerability which most systems face. While it can be argued that the motives of an attacker will differ for each situation, any password system must evaluate security in terms of the difficulty of an attacker targeting any, rather than one particular, account. This is because it is the more common attacker motive and, further, because a system secure against this attacker objective is automatically secure against an attack on a single specific account, although the converse is not true. Consequently parameterizing a system on the basis of the total number of users within the "security domain" being protected is of primary importance.

It will be helpful here to define several parameters:

K, as discussed above, is the absolute size of the password space.

$K_1$ is the actual space the attacker needs to search in order to break into a particular user's account.

N is the number of users in the "security domain". The definition of "security domain" is situation specific. Some concrete examples would be: a DEC VMS multiuser minicomputer; a network of SUN workstations and servers which use a common /etc/passwd file managed by the NIS name server, or a Kerberos realm serving an entire organization. The number of users within these domains could range from 50 users on a minicomputer to several thousand users being served by a common Kerberos server.

T is the assumed maximum time in seconds which the attacker can spend on the attack. T depends on many factors including the time interval, t, between which password aging is enforced i.e. the period after which a user is required to change passwords. When an attacker captures strings encrypted with passwords, a limited time is available to complete the dictionary attack before the passwords change. For instance, after time t/2, it is likely that half the passwords captured by the attacker have changed, and by time t, all the passwords have changed. Depending on the system other factors may also come into play.

E is the encryptions per second for the particular password scheme, which the most powerful attacker is likely to perform. This parameter, to a great extent, will be determined by the type of computing platform which the attacker has access to. Since this "access" could be illegal this is a difficult number to calculate. Unless the attacker in question is a large organization, like the espionage branch of a foreign government, it may be practical to assume that the attacker has access to a high end personal computer or workstation or a UNIX or other high power server. The parameter E can be calculated in various ways, see for instance Karn and Feldmeir's (KARN89) analysis.

C is an implementation specific constant which corresponds to the effort which must be expended by the attacker on a per user basis for a specific system. For instance, in a UNIX system the attacker searching through a dictionary of a given size would, because of salting (see Morris, R. and K. Thompson "Password security: A case history", Communications of the ACM, 22 (11), November 1979), have to actually be searched through a number of dictionary words equal to the dictionary size multiplied by a factor of 4096. Thus in this particular case, the implementation constant C would be 4096. However, the implementation constant C could be reduced if the attacker uses pre-encrypted dictionaries and has sufficient space on his computing platform to store the salted variations and if the time to search is small as compared to the time required to encrypt. As can be seen from the above example, the constant C can be properly chosen only when specific details of the attack are known.

Based on these parameters, the criterion for protection against a dictionary attack can be defined. The first criterion, which at times is the only one considered by the designers of systems is:

Criterion 1: $K > E \times T \times C$

According to this criterion, a password space must be chosen which is large enough so as not to be easily broken by an attacker in a "reasonable" time. Gasser's analysis adds two closely related, very useful criterion, namely:

Criterion 2: The probability of occurrence of the most probable passwords in the password space should be low.

So for instance, although the maximum password space K is very large, the fact that users choose common natural language words with a very high probability can, by itself, make the system vulnerable to dictionary attacks. Gasser discusses the criterion in the context of pronounceable password generators, wherein he points out that it is of no benefit to have an overall maximum key space K which is very huge if a few passwords have a very high probability of being generated, and are generated very frequently by the system thus resulting in the actual key space $K_1$ being too small. A closely related criterion, which appears to be implicit in Gasser's discussion of the password probability distribution is:

Criterion 3: All passwords in the password space must be of roughly equally probable.

This is really a generalization of Criterion 2, and ensures that there does not exist a subset of the maximum password space K which is so small that it can be easily attacked in lieu of the entire space K to breach system security.

Criterion 4: In an N user system with an actual password space of size $K_1$, the attacker should have to search, on average, a password space of $K_1/N$ in order to break into any one account. This can be expressed as: $K_1/N > E \times T \times C$ Since the attacker need only, on average, search through half any given space to expect to find a password, the more precise figure is $K_1/2N$. Criterion 4 may be used in place of Criterion 1 since any system meeting Criterion 4 will, by definition, meet Criterion 1, whereas the converse is not true.

Criterion 5: It should not be possible to divide the password space into B buckets or categories, $b_1, b_2, \ldots, b_B$, from which users choose passwords, with the probability of users choosing passwords from a respective bucket being $p_1, p_2, \ldots, p_B$, such that $p_i > |b_i|/K_1$ where $b_i$ is the smallest bucket.

Meeting Criterion 5 is a necessary, but not a sufficient, condition for meeting Criterion 4. It ensures that the smallest bucket or category is large enough to thwart the attacker. The security of the system, in terms of password space size, is as secure as the size of the smallest bucket.

The "Sandia System" is a pronounceable password generator distributed by Sandia Labs along with a version of the Kerberos V source code, see files 7clcpwd.c and 7cldpwd.c in Sandia's Kerberos V distribution. The Sandia System works as follows:

25 templates have been created to represent typical rules of pronunciation in English, for instance "cvcvcvc" is a template representing words formed by a vowel followed by a consonant followed by a vowel. . .

The templates are formed from sets representing, vowels, consonants, double vowels, ending vowels, etc.

To generate a password the system randomly indexes into one of the 25 templates i.e. buckets, all 25 templates being equally likely to be picked.

The system then picks, at random, a password from that particular template, this being a 7 character password.

In order to inflate the password space, either 1 of 10 digits, or 1 of 26 alphabet letters, is randomly added to the password, to bring the total password size to 8 characters. If the eighth character is a digit from 0 to 9, then because there are 10 choices of digits and the digit can be added in any one of eight positions, the password space is expanded by a factor of 80. If one of the characters from A to Z is randomly added to the string, then the effective password space is increased 208 fold.

Users are presented with several such passwords and asked to pick one.

The addition of the eighth character may make the password fairly difficult to pronounce, especially when the eighth character/digit appears in the middle of a pronounceable syllable. Further, presenting users with several choices and letting them pick one, introduces another filter through which selected passwords must pass. It is conceivable that the passwords picked by users are actually from a much smaller space than would be suggested by the system parameters. However, no evaluation has been performed to determine if this is indeed the case. Since the 25 template-buckets are indexed into with uniform probability, it is likely that 1/25th or 4% of all users in a N user system pick passwords from a particular template or bucket. Given the number of characters in the set of vowels, consonants, etc., the size of each template or bucket can be calculated. The size of each of the templates, without the addition of the random eighth character is shown in FIG. 1.

As shown in FIG. 1, the distribution is highly non-uniform, with most of the passwords in a few large buckets. This dramatically affects the security of the system. The total space K of 7 character passwords is 71,213,792, and after inserting the eighth character the total space K expands to an impressive 14.5 billion. However, in a 100 user system, 4 users picked passwords from the smallest bucket, which has a mere 135,800 7 character passwords, and the eighth character increases the password space to only 27 million. While an attacker may balk at searching through 14.5 billion passwords, a space of 27 million can be searched without excessive effort in order to break into 4 user accounts on a hundred user system. Still further, the attacker would on average have to search through less than 3.5 million passwords to break into 1 account on a 100 user system.

The Gasser/NIST system, which as noted above, is being adopted by NIST, see FIPS92, works as follows:

There are 34 units, the characters A to Z, except Q, and the characters CH, GH, PH, RH, SH, TH, WH, QU and CK; each unit having an associated probability of selection which corresponds roughly to the probability of the occurrence in English of the applicable unit's character.

A series of rules determine which units may appear where in a generated password. These rules are encoded in two tables, i.e. the unit and diagram tables. The former describes special rules for determining where the units may appear, and whether they are vowels or consonants, etc. The latter describes the rules for determining if two units can be juxtaposed.

To generate a password the system selects the first unit, from one of the 34 units, based on the probability of occurrence associated with each of the units.

The system then forms syllables by selecting successive units from the 34 units, based on the rules in the unit and diagram tables. These syllables are then concatenated together to form the password.

If a particular selected unit is inappropriate in a particular position within the password, that unit is rejected, and another unit is selected. If the substitute unit is also rejected, another unit is picked. This process is repeated 100 times, after which the entire syllable is rejected. As noted by Gasser, see GASS77, the limit of 100 is rarely reached.

The Gasser/NIST system has been analyzed in GASS77 and FIPS92. The total password space K is of size 18 million for 6 character passwords, 5.7 billion for 8 character passwords and 1.6 trillion passwords for 10 character passwords. The most probable passwords have a low probability of occurrence. The probability of occurrence of most passwords are roughly equal.

Though not part of the NIST standard, Gasser describes a slight modification to the system which guarantees that all passwords are equally likely. Pursuant to this modification, the system generates the passwords completely at random.

In the Gasser/NIST system each unit represents a bucket of passwords. However, unlike the Sandia System which randomly indexes into the buckets, in the Gasser/NIST system the probability that a user selects a password from a particular bucket is determined by the probabilities associated with the individual units. In the Gasser variation mentioned above, the probability of selecting from a particular bucket, is not the probability associated with the unit, but rather the probability given by the ratio of the size of the bucket to the total size of the password space.

The distribution of passwords into buckets in the Gasser/NIST system is shown below in FIG. 2A. FIG. 2A represents the distribution of passwords generated by a Gasser/NIST system completely at random. As the passwords are generated randomly, sorting the sample into buckets will reflect the actual distribution of passwords into buckets.

As can be seen, the distribution of passwords is highly non-uniform. However, unlike the Sandia system, all the buckets themselves are not equi-probable. That is, the probability of any given password appearing in a given bucket, is dependent on the size of the bucket and is different from the probability of a bucket itself; the latter being the probability that the system chooses that bucket to generate a password. Rather, the probability that a bucket is chosen by the system is tied to the probabilities assigned to the individual units. FIG. 2B juxtaposes the distribution of the passwords into buckets with the probability of a particular bucket being chosen. For purposes of FIG. 2B, it is assumed that there is an equal probability that a user will pick a password from any of the particular buckets.

As can be seen from FIG. 2A there are several very small buckets, i.e. the buckets for R, T, X, GH, SH, TH, QU and CK. FIG. 2B suggests that rather than attacking the smallest bucket itself, it is more beneficial for the attacker to attack the small buckets with a relatively high probability of being chosen, e.g. the buckets for R and T. It is likely that slightly less than 5% of users will have passwords generated from the R bucket and another 5% from the T bucket. Yet the size of the R bucket is a mere 0.31% of the overall password space K, and the T bucket a mere 0.22%. Consequently, an attacker could break into 4 accounts of a 100 account system after searching through only 12.5 million passwords, and might break into one account, on average, after searching 1.6 million passwords. Using the Gasser variant, i.e. where passwords are generated randomly, the probability of a user having a password generated from a bucket is exactly equal to the size of the bucket. So for instance, instead of 5% of users having passwords from the R or T bucket, only approximately 0.3% of users have passwords generated from this bucket. The number of accounts that can be compromised, on average, is thereby decreased, but the problem remains that a rather limited search by an attacker will result in a breach in the system security.

Another pronounceable password generator has been developed by Digital Equipment Corporation and will be referred to as the DEC system. The DEC system utilizes a Markov model to train samples of natural language. Markov models are discussed in more detail below in describing the preferred embodiment of the present invention. Suffice it to say at this point that this training yields a transition probability matrix.

The DEC system generator then utilizes the transition probability matrix developed using the Markov model to probabilistically determine the next state. For example, from the state "Q" it is highly likely that the next state is a "U" if the english language is being utilized. After selecting a certain number of characters, the system requires that the information content of the portion of the password formed at this point be calculated. This is done using a well-known mathematical formulation for information content. Additional characters are then added until the information content meets a predetermined threshold value. The threshold value is selected so as to ensure that the pronounceable password generated is not a bad password, i.e. one selected from natural language, jargon, acronyms, dates, or other derivative thereof.

However, the DEC system likewise suffers from the smallest bucket attacks which have been discussed above with regard to the Sandia system and Gasser/NIST systems. This appears to be caused by the transition probabilities utilized by the system. In particular, the DEC system, as understood, uses buckets which are created based upon the transition probabilities of characters, i.e. unigrams, bigrams, etc., occurring in the English language. Because these transition probabilities vary, the Markov model develops buckets of passwords which are small and buckets of passwords which are large. Stated another way, characters with a greater transition probability in the English language will be generated more often than those with a lower probability in the English language. Thus, the number of users using generated passwords with characters having a high transitional probability in the English language is increased.

OBJECTIVES OF THE INVENTION

It is therefore an object of the present invention to provide a computer and computer programming for generating pronounceable passwords which provide greater security than conventional systems and techniques. It is a further object of the present invention to provide a computer and computer programming for generating pronounceable passwords which require that an attacker perform a more exhaustive search to uncover one or more of the passwords being utilized by the system users. It is yet another object of the present invention to provide a computer and computer programming for generating pronounceable passwords which provide increased security for a user account. It is a still further object of this invention to provide a computer and computer programming for generating pronounceable passwords which are not subject to a smallest bucket attack. It is still another object of this invention to provide a computer and computer programming which can be utilized to quickly generate secure, pronounceable passwords. It is yet a further objective of this invention to provide a computer and computer programming for generating secure, pronounceable passwords which are user friendly.

Additional objects, advantages and novel features of the invention will become apparent to those skilled in the art upon examination of the following as well as by practice of the invention. While the invention is described below with reference to preferred embodiments for generating pronounceable passwords, it should be understood that the invention is not limited thereto. Those of ordinary skill in the art having access to the teachings herein will recognize additional applications, modifications and embodiments in other fields (including, but not limited to, those relating to smart cards, automatic tellers and automatic locks), which are within the scope of the present invention as disclosed and claimed herein and in which the present invention could be of significant utility.

SUMMARY OF THE INVENTION

In accordance with the invention, a pronounceable security password, for use in encrypting and decrypting messages, is formed by a computer, in accordance with its programmed instructions, using a plurality of stored first word segment portions each having at least one character and a plurality of stored second word segment portions each having at least one character. The password is generated utilizing an identified transition number for each of the first word segment portions which corresponds to the number of second word segment portions in an associated set of second word segment portions. The associated set of second word segment portions includes one or more different second word segment portions, each of which is combinable with the associated first word segment portion to form a pronounceable word segment, typically a pronounceable syllable.

In one implementation of the invention, one of the plurality of first word segment portions with an associated transition number greater than zero is randomly selected by the computer. As used herein, random selection means that the selection is of substantially equal probability. Thus, selection of any one of the plurality of first word segment portions which have an associated transition number greater than zero, is of substantially equal probability. Next, a second word segment portion, from the associated set of second word segment portions, is randomly selected by the computer. Hence, selection of any one of the second word segment portions in the set associated with the selected first word segment portion, is also of substantially equal probability. The selected first and second word segment portions are combined by the computer for use as at least a part of the pronounceable security password.

According to other aspects of this implementation, a determination is made by the programmed computer as to whether or not consecutive characters of the combined first and second word segment portions are identical to a first word segment portion having an associated transition number that is less than the predetermined threshold transition number which may be preloaded and accessed from storage, written into the programmed instructions or input in real time. If so, the combined first and second portions are discarded by the computer and substitute first and second word segment portions are randomly selected and combined as described above. Alternatively, if desired, the selected second word segment portion alone could be replaced in lieu of replacing both the selected portions. A further check can be made by the programmed computer to determine if consecutive characters of the part of the password formed by the substitute combined word segment portions are identical to a first word segment portion which has an associated transition number of less than the predetermined threshold transition number. If so, another substitution is performed by the computer.

Once a satisfactory first part of the pronounceable password has been generated by the computer as described above, a first word segment portion, having an associated transition number greater than zero and which corresponds to one or more consecutive characters at the end of the first part of the password, e.g. the last two characters, is identified by the computer, in accordance with its stored programming instructions. Next, another second word segment portion, which corresponds to the identified consecutive characters, is randomly selected by the programmed computer from the set of second word segment portions associated with the first word segment portion. The first part of the pronounceable password is combined with this later selected second word segment portion by the programmed computer to form a still greater part of, or to complete, the pronounceable security password. If desired, the computer can be programmed to make another check to determine if the consecutive end characters of this completed or extended part of the password corresponds to a first word segment portion which has an associated transition number of less than a predetermined second threshold transition number, which is preferably different from (i.e. lower than) the first threshold transition number. The predetermined second threshold transition number may also be preloaded and accessed from storage, written into the programmed instructions or input in real time. In this regard, it is beneficial to ensure that the initial part of the password has consecutive characters which correspond to a first word segment portion with a relatively high transition number. As additional characters are added to the password the later consecutive characters can correspond to first word segment portions with somewhat lower transition numbers without significantly jeopardizing the security of the password.

If the later identified consecutive end characters fail to meet the second threshold, the later selected second word segment portion is discarded by the programmed computer. Another second word segment portion is then selected and combined with the first part of the pronounceable password by the computer, as described above. The computer can be programmed so as to perform a check to determine if the second threshold is met by the substitute second word segment portion. The process continues until an acceptable pronounceable password is generated.

According to an alternative implementation of the invention, once a satisfactory first part of the pronounceable password has been generated by the computer as described above, another of the plurality of first word segment portions which have an associated transition number greater than zero, is randomly selected by the computer, in accordance with its programming instructions. A second word segment portion, from the set of second word segment portions associated with this later selected first portion, is next randomly selected by the computer. The computer is programmed to combine the second selected first and second portions. The first part of the pronounceable password is then combined by the programmed computer with the combined second selected word segment portions to form a still greater part of, or to complete, the pronounceable security password. If desired, the computer can be programmed to make a check to determine if consecutive characters of this completed, or larger part of, the password correspond to any of the plurality of first word segment portions which has an associated transition number of less than the predetermined second threshold transition number.

If so, the second selected first and second word segment portions are discarded by the computer. The process continues by driving the computer to randomly select another, or third, of the plurality of first word segment portions which have an associated transition number greater than zero. Next, a third of the second word segment portions within the set of second word segment portions associated with the third selected first word segment portion, is randomly selected and combined with the third selected first word segment portion by the programmed computer. The first part of the pronounceable password is then combined by the computer with the combined third selected word segment portions to form a completed, or extended part of, the pronounceable security password. The computer, in accordance with its programmed instructions can now determine if consecutive characters of this extended part of the password correspond to a first word segment portion having a transition number which is less than the aforementioned second threshold transition number.

According to a third implementation of the present invention, each of a plurality of first word segment portions is categorized based upon its transition number into one of at least two categories and stored. One or more selection categories can then be chosen from the at least two categories. The chosen category(ies) may also be preloaded and accessed from storage, written into the programmed instructions or input in real time. One of the plurality of first word segment portions categorized within the selection categories, is randomly selected by the programmed computer. Next, one of the second word segment portions, from the set of second word segment portions associated with the selected first word segment portion, is randomly selected by the computer. The selected first and second portions are combined by the computer to form at least a part of the pronounceable security password. Preferably, the transition number associated with each first word segment portion categorized within the selection categories is larger than the transition number associated with the first word segment portions categorized in a non-selection category.

The computer is programmed to next make a determination as to whether consecutive characters of the part of the pronounceable security password which has been generated correspond to a first word segment portion categorized in a non-selection category. If so, the selected second word segment portion is discarded by the computer and the computer is driven by its programming instructions to randomly select a new, or second, second word segment portion, within the set associated with the selected first word segment portion, and to combine the newly selected second word segment portion with the selected first portion to form at least a part of the pronounceable security password.

Alternatively, the computer could be programmed to replace both of the selected portions. A check can now be made by the programmed computer to determine if consecutive characters of this later generated part of the password correspond to a first word segment portion categorized in a non-selection category. If so, another substitute second word portion is selected by the computer as described above.

Once an acceptable first part of the pronounceable security password has been generated, a first word segment portion corresponding to consecutive characters at the end of the first part of the password is identified. Another second word segment portion, from the set of second word segments associated with this corresponding first word segment portion, is randomly selected by the programmed computer. The first part of the pronounceable security password is then combined by the computer with the second selected second word segment portion to complete or form at least an extended portion of the pronounceable security password. Once again, the computer can be programmed to make a determination as to whether or not consecutive characters of this completed, or extended portion of, password, correspond to a first word segment portion categorized in a non-selection category. If so, the later selected second word segment portion is discarded by the computer and a substitute second portion is randomly selected as described above.

According to a further implementation of the invention, once a satisfactory first part of the pronounceable password has been generated by the programmed computer as described in connection with the third implementation of the invention, another first word segment portion categorized within selection categories is randomly selected by the computer. The selection categories preferably include a larger number of categories than those used in forming the first part of the password. These later selection categories may also be preloaded and accessed from storage, written into the programmed instructions or input in real time. Next, another second word segment portion, from the set of second word segment portions associated with the second selected first word segment portion, is selected and combined by the programmed computer with the second selected first word segment portion to form a further part of the password. The first part of the pronounceable password is then combined by the computer with this further part of the password to complete, or form an extended portion of, the pronounceable security password. Consecutive characters of the completed or portion of the pronounceable security password thus created may now be checked by the computer for correspondence to first word segment portions categorized in non-selection categories, and the later created part of the password is accepted or discarded by the computer, as appropriate, i.e. if consecutive characters correspond to a first word segment portion in a non-selection category the later created part is discarded.

If the later created part is discarded, a third one of the first word segment portions categorized within the later selection categories is randomly selected by the programmed computer. Another or third one of the second word segment portions in the set associated with the third selected first word segment portion, is then selected by the computer. The third selected first and second portions are combined by the computer to form a further part of the password. The computer, in accordance with its programmed instructions then combines the first part of the pronounceable password with this further part of the password to complete, or form at least a larger portion of, the pronounceable security password. If desired, the computer can be programmed to perform another check to determine if consecutive characters of this last generated extended part of the password corresponds to a first word segment portion categorized in a non-selection category.

In still another or fifth implementation of the invention, each of a plurality of word segments is categorized into one of at least two categories, based upon a transition number corresponding to the number of different second word segment portions included in word segments which have a first word segment portion identical to the first portion of the word segment being categorized. One or more selection categories are identified from these categories. The selected category(ies) may be preloaded and accessed from storage, written into the programmed instructions or input in real time. At least two of the word segments categorized within the selection categories are randomly selected and combined by the computer, in accordance with its programmed instructions, to form at least a portion of the pronounceable security password. The transition number associated with each word segment categorized in a selection category is preferably larger than the transition number associated with word segments categorized in non-selection categories.

The computer's programmed instructions, the word segment portions, categorized word segment portions and categorized word segments, as applicable, can be stored on one or more electronic or magnetic storage devices, such as a CD, ROM or disk. If preloaded, the predetermined threshold transition number(s) and selection category(ies) are also stored on the one or more electronic or magnetic storage devices. The categorized word segment portions and the categorized word segments may be stored in categories or with a category designation. Alternatively, if desired, the computer could be driven by its programmed instructions to categorize, into one of at least two categories, each of the word segments or word segment portions based upon a transition number corresponding to the number of different second word segment portions included in stored word segments or word segment portions which have a first word segment portion identical to that of the word segment or word segment portion being categorized.

In each of the above described embodiments, the computer is programmed to apply the pronounceable security password to encrypt or decrypt messages between system users. In this regard, the programmed computer may be operable in an RSA or other type cryptosystem. The pronounceable security password could, in such a case, be used as a user's portion of a private crypto-key associated with the split private key cryptosystem.

According to other general aspects of the present invention, each first word segment portion is preferably a bigram and each second word segment portion is a unigram. The characters can be chosen from the English or another alphabet. Passwords of eight or more characters, are preferably generated by the programmed computer to provide adequate security. This can be done, for example, by utilizing a single first portion of a word segment which is a bigram and at least six second portions of the word segments, each of which is a single character. The pronounceable security password may form a part of a private key associated with a private key cryptosystem, such as an RSA system. In any event, it is preferable that the pronounceable security password which is generated be short.

DESCRIPTION OF THE PREFERRED EMBODIMENT

Before describing the preferred embodiment of the present invention it will be helpful to first discuss the Markov model, which is preferably used to extract a set of characteristics, C, from a selected dictionary in accordance with the present invention. For purposes of this discussion it is assumed that the dictionary to be used was generated by a K order Markov model, and that characteristics, C, correspond to the transition probabilities of the model. In accordance with the present invention, preferably using statistical inference on the Markov chains, a string of characters of a password can be generated by a given Markov model.

Figure 9:
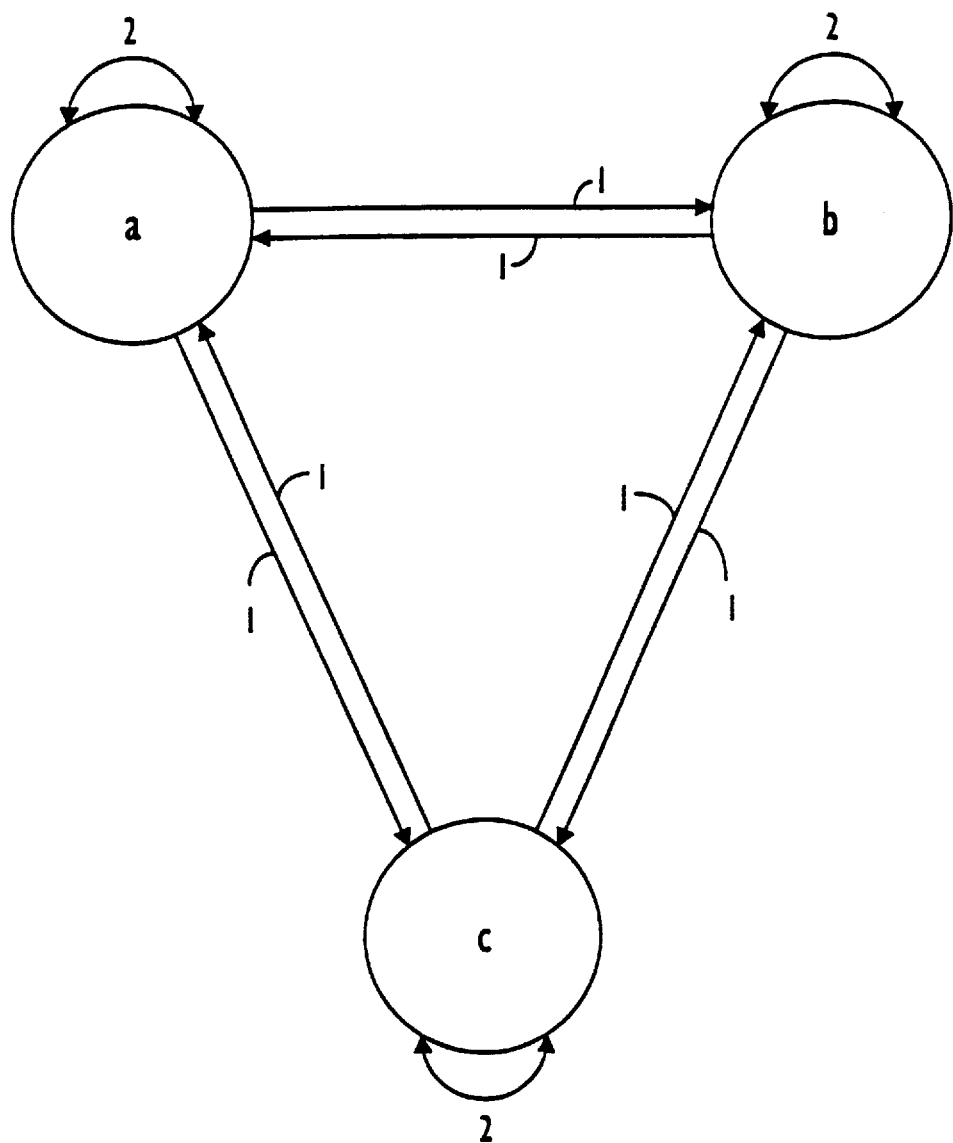
FIG. 9 illustrates an example of a Markov model.

An example of the Markov model is shown in FIG. 9. Likely strings 1 can be generated by beginning in any state and following high probability transitions such as ab, bc, ac, and ba from FIG. 9. The unlikely strings 2 generated by this model contain zero transitions, for example aa, cc, cc, bb, aa of FIG. 9.

A Markov model M is a quadruple, [m,A,T,k], where m is the number of states in the model, A is the state space, T is the matrix of transition probabilities and k is the order of the chain. In FIG. 9, an example of such a model for the three character language shown is: M=[3], [a,b,c], T, 1], where $$T = \begin{bmatrix} 0.0 & 0.5 & 0.5 \\ 0.2 & 0.4 & 0.4 \\ 1.0 & 0.0 & 0.0 \end{bmatrix} \quad (1)$$

giving T [a,a]=0.0, T[a,b]=0.5, etc.

A key characteristic of a K order Markov model is that the probability of transition T[a,b], depends only on the previous states that have been visited. In a first order model the probability of a transition ending in state b depends only on the state from which the transition began (say a). Therefore T[a,b]=Prob (b,a). In a second order model, the probability of entering state b from state a also depends on the state of the process prior to entering a. For example, for state c, T[a,b]=Prob (b,ac).

As FIG. 9 illustrates, the state space very naturally corresponds to the alphabet of the natural language from which passwords are expected to be drawn.

Although the use of bigrams (i.e., a first order Markov model) is adequate for certain applications, the use of trigrams is preferred. A second order Markov model will give better overall results than a first order model. However, it should be noted that the size of the Markov chain that will need to be stored increases with increasing order of the Markov model. Thus for a first order model, the matrix may occupy about 5–6 KB of storage, while for a second order model it could occupy 175 KB.

Pronounceable passwords are generated, according to the present invention, by generating a string of pronounceable characters whose probability of inclusion in a generated password is unrelated to the frequency with which the sequence of characters within the generated password appear in the English language or whatever other language may be of interest. Thus passwords are generated which are not subject to a smallest bucket attack and are therefore more secure than those generated by conventional pronounceable password generators. A Markov model is used to generate a transition probability matrix. The transition probability matrix is generated by a second order Markov model, using well-known statistical techniques, for words in a selected word dictionary. Thus, a set of pronounceable word segments having three characters are modeled and the probability of transition from a first portion of each word segment, which is a bigram, to a single third character which completes the word segment is determined.

Although in the preferred embodiment described herein, a second order Markov model is utilized, those skilled in the art will recognize that the technique could be modified to use other orders of Markov models. The transition probability matrix is adjusted to reduce the threat of smallest bucket attacks. To accomplish the adjustment each bigram ij is associated with a Count [i,j] which corresponds to the number of non-zero transitions beginning with the bigram ij. For example, for the bigram TH, the non-zero transitions might be A, C, E, I, O and S which form pronounceable word segments THA, THC, THE, THI, THO and THS. In this example, the number of non-zero transitions beginning with the bigram TH would be six and, therefore, the Count [TH] would equal six.

Each bigram ij can now be separated into categories based upon its Count [ij]. For example, three categories might be established. The first category could be limited to all bigrams with more than fifteen transitions, i.e. a Count [ij] greater than fifteen. The second category could be limited to bigrams with between five and fifteen transactions, i.e. a Count [ij] less than or equal to fifteen and greater than or equal to five. The final category might contain all bigrams which have less than five transitions emanating from them, i.e. a Count [ij] less than five. All bigrams having a zero transition remain uncategorized and are not used in the generation of the pronounceable passwords. This is because, if the transitions are zero the combinations are likely to be unpronounceable. The transition probability of all non-zero transitions emanating from a bigram ij are now replaced with the reciprocal of the Count, i.e. 1/C[ij]. This in effect makes all the transitions emanating from the bigram equi-probable. By adjusting transitions in the Markov model, the systems can be protected against the smallest bucket attacks which have been described earlier and which result in the insecurity of conventional systems. For example, for the bigram TH the transition to any of the transitions A, C, E, I, O or S are equi-probable and independent of the frequency with which THA, THC, THE, THI, THO, and THS occur in the English language, or any other language which may be of interest.

To further reduce the probability of small buckets, a bigram is randomly selected from the first category of bigrams, i.e. the category of bigrams having the highest transition counts. The randomness of the selection ensures that the probability of the selection of any of the bigrams in the first category is equal or substantially equal. The next character is selected from the legal transitions associated with the selected bigram. This selection is also random and thus the selection of any of the legal transitions as the next character is also of equal, or substantially equal, probability. The selected characters are combined. If the last two characters of the combination form a bigram which is categorized lower than the first category, i.e. a bigram with a transition count less than fifteen, the selected characters are discarded and a new random selection is begun again. Alternatively, the selected transition character may be discarded and a substitute transition character randomly selected from the transitions associated with the selected bigram.

Rather than categorizing the bigrams, a threshold transition valve can be selected. Bigrams formed by the consecutive characters of the portions of a password generated by random selection of bigrams, with non-zero transition counts, and associated transition characters can be checked to ensure that the transition count of the formed bigrams exceed the threshold transition valve.

Figure 1:
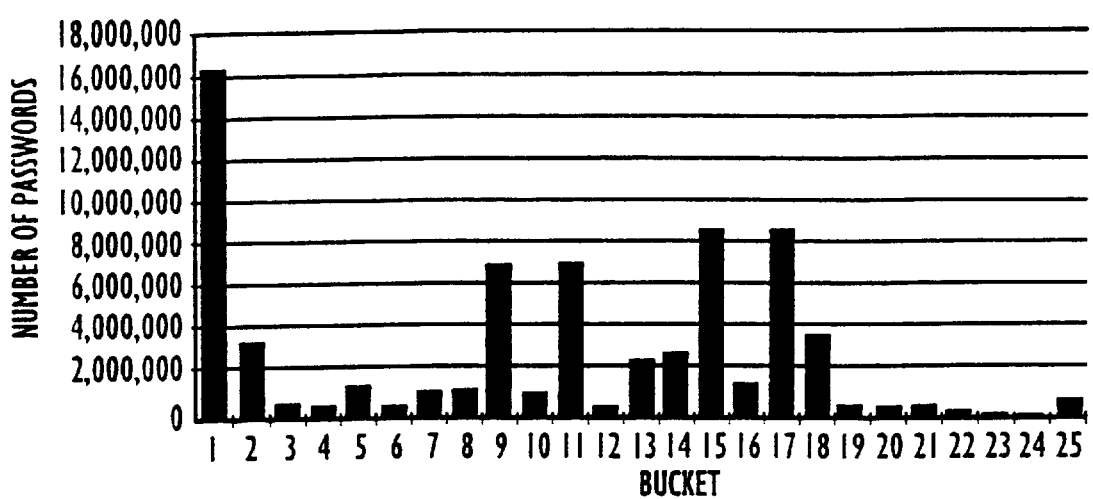
FIG. 1 shows the distribution of passwords in a Sandia System.
Figure 2A:
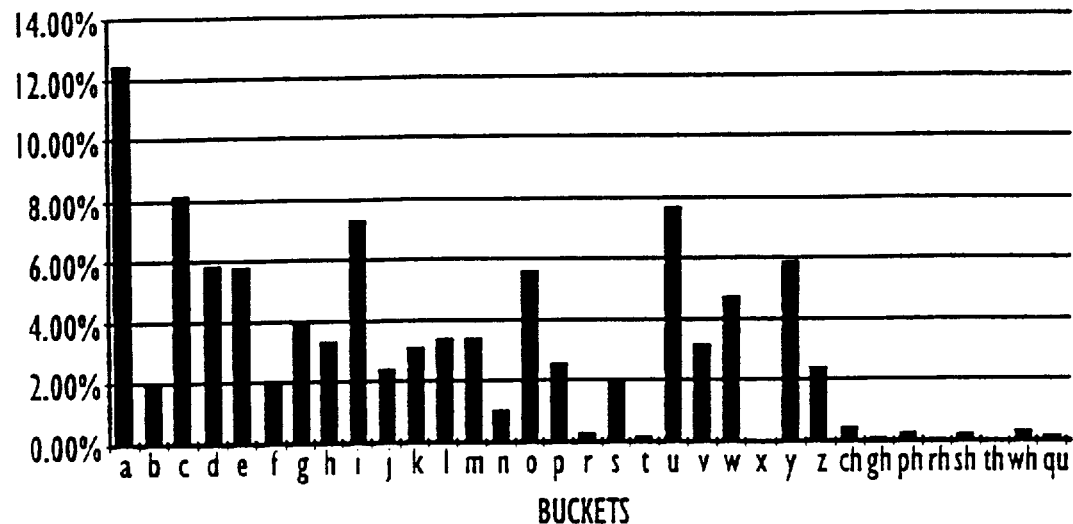
FIG. 2A shows the distribution of passwords in a Gasser/NIST System.
Figure 2B:
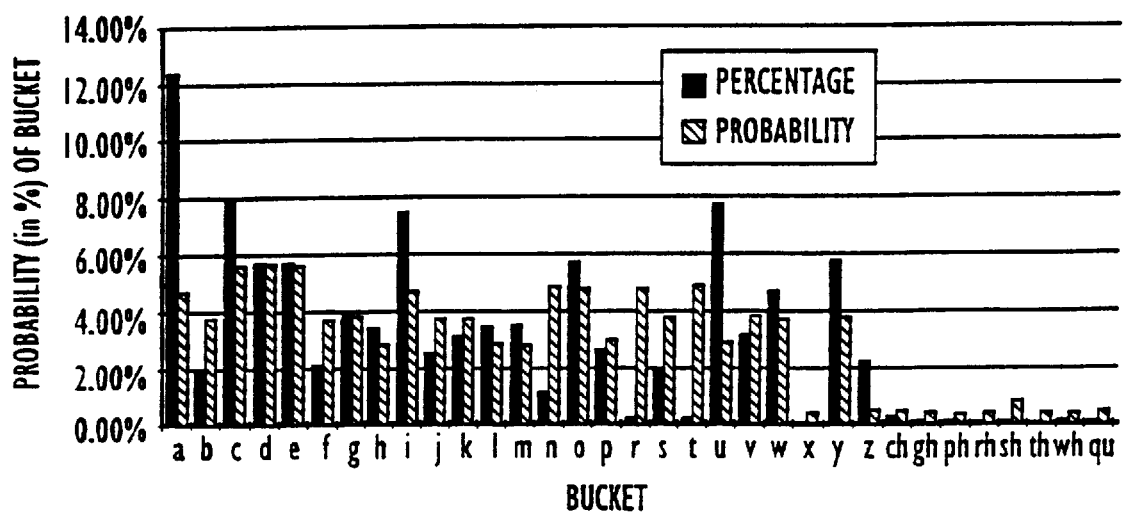
FIG. 2B shows the probability of selection of passwords in a Gasser/NIST System.
Figure 3:
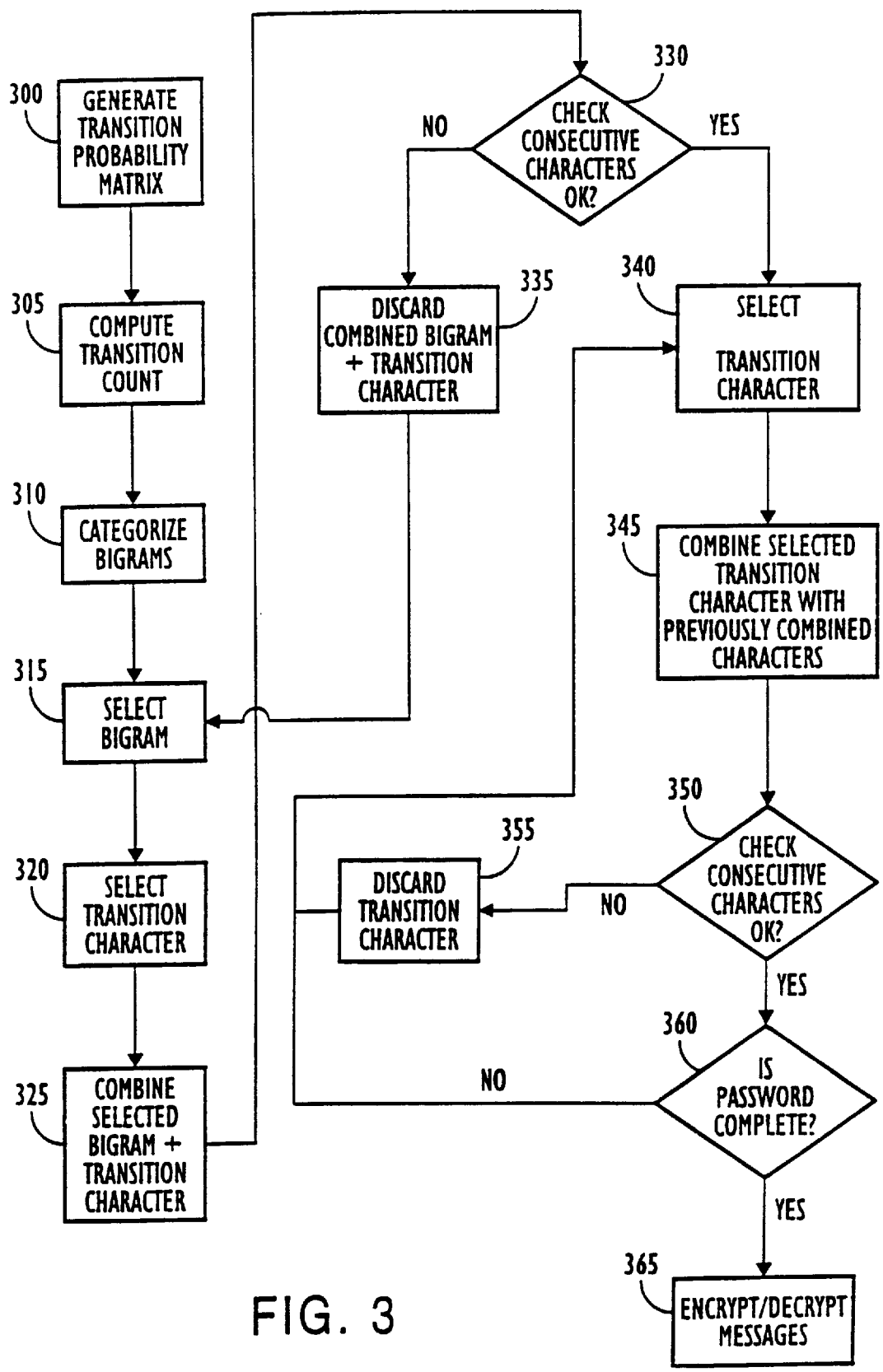
FIG. 3 is a flow diagram depicting one implementation of the present invention.

Referring specifically to FIG. 3, in step 300, a transition probability matrix for pronounceable word segments, taken from a selected English language dictionary, is generated using a second order Markov model. The pronounceable word segments are formed of three characters. In step 305 a transition Count [ij] is computed for each non-zero transition emanating from each bigram which forms the first two characters of a pronounceable word segment. The bigrams are then categorized in step 310 based upon the associated transition numbers. Although preferably three categories are selected as noted above, the bigrams may be categorized into any desired number of categories so long as the categories are based upon the computed count associated with the bigrams. Steps 300 to 310 will normally be performed off line on a one time basis, while the steps occurring thereafter will typically be performed on-line, in real time.

A bigram is next randomly selected from one or more selected categories. The selection of any one of the bigrams within the selection categories is of substantially equal probability. It is normally preferred to limit the selection of the initial bigram to a category containing bigrams with a high transition count. Subsequent selections may be made based upon bigrams with a lower transition count, because, from a security standpoint, the number of transitions emanating from later characters in the string forming the pronounceable password will be of less importance. The reduced importance of the number of transitions emanating from the later characters in the string might be most easily understood, by analogy, the following example. If the genealogy of some number of human couples in a first generation is followed through multiple generations, it will be understood that those couples which have had a greater number of offspring in the early generations will have a greater number of offspring than those couples who have had a smaller number of offspring in the early generations even if the later have had a relatively larger number of offspring in later generations. This is because the total number of offspring grow expedientially with each generation. Thus by having a greater number of offspring in the earlier generations of the family, a greater number of total offspring will exist as compared to the case where a relatively smaller number of offspring occur in the earlier generations and a relatively greater number of offspring occur in the later generations.

Thus by ensuring that the initially selected bigrams have a high transition probability, it will ensure that a relatively greater number of bigrams are available for subsequent selection. On the other hand, the number of transitions emanating from the last selected bigram will have very little impact on the security of the pronounceable password which has been created.

In step 320, a transition character associated with the selected bigram is randomly selected. Once again, the random selection ensures that the selection of any one of the transition characters which have been utilized in determining the transition count for the selected bigram, will be of a substantially equal probability. The selected bigram and transition character are combined in step 325.

Next, it is determined if the bigram formed by the last two consecutive characters of the generated password portion has a transition count within an acceptable range. For example, this check may be preformed by ensuring that the bigram formed by the last two characters of the generated password portion is within one of the categories used in selection of the selected bigram. If the transition count of the bigram formed by these characters is unsatisfactory, the generated word segment is discarded in step 335 and the process begins again with the selection of a new bigram as previously discussed in step 315. If the bigram formed by the last two characters of the generated word segment are acceptable, a transition character associated with the bigram formed by these characters is randomly selected in step 340. This latter transition character is combined in step 345 with the previously generated password portion. In step 350 a determination is made as to whether or not the last two characters of this extended word segment form a bigram with an associated transition Count [ij], which is acceptable. Once again, this step could be performed by comparing the bigram formed by the last two consecutive characters of the extended password segment with bigrams which have been categorized within either the categories from which the initial bigram was selected in step 415 or from other subsequently selected categories. If the bigram formed by the last two characters is unacceptable, it is discarded in step 355 and a substitute transition character is selected as described in step 340. If the bigram formed by the last two characters in the extended password portion is acceptable, a determination is made in step 360 as to whether or not the password is complete. For example, the system can be arranged to generate passwords of any desired number of characters although in the preferred embodiments eight or nine character passwords are utilized. If the addition of the last character does not complete the password, a further transition character is selected based upon the bigram formed by the last two letters of the extended password segment as described in step 340 and the process continues until a full string of acceptable password characters have been selected. In a typical practical application, multiple pronounceable passwords, say 20, will be generated in the manner described above and presented to the user. The user then selects a desired password from those presented. The generated pronounceable password can then be applied to a message for encryption and decryption purposes as indicated in step 365.

Figure 4:
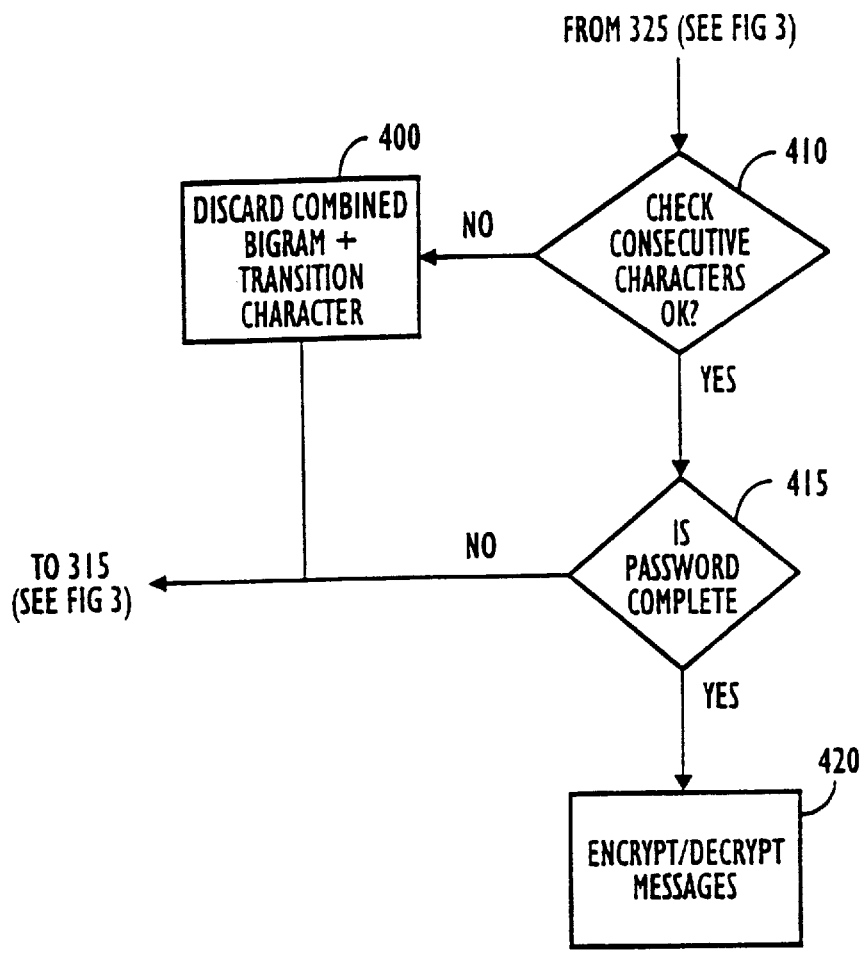
FIG. 4 is a flow diagram depicting another implementation of the present invention which is a somewhat modified version of that depicted in FIG. 3.

FIG. 4 is a simplified flow chart of an alternative implementation of the present invention. The FIG. 4 implementation is performed utilizing steps identical to steps 300 through 325 of FIG. 3 but varies thereafter. In particular, in step 410 the portion of the password formed by the selected bigram and transition character combined in step 325 of FIG. 3, are analyzed to determine if the bigram formed by the last two characters of the segment have an associated transition count which is within an acceptable range. If not, the entire generated password portion is discarded and the process proceeds with the selection of another bigram and transition character as described in FIG. 3 beginning with step 415. If the transition count associated with the bigram formed by the last two characters of the generated portion of the password are acceptable, a determination is made in step 415, as to whether or not the password portion completes the password. If not, another bigram and transition character are selected and combined as described in connection with FIG. 3, see steps 315 through 325. This combination is then combined with the previously generated password portion to add a further portion to the password. One further bigram and transition would be selected to develop a pronounceable password with the desired number of characters. For example in this preferred embodiment, a nine letter password would be generated. As discussed above, preferably multiple passwords will be generated and presented to the user, who would then make a selection of one of the passwords. Once the full password has been generated, it can be used in step 420 to encrypt and decrypt messages.

Figure 5:
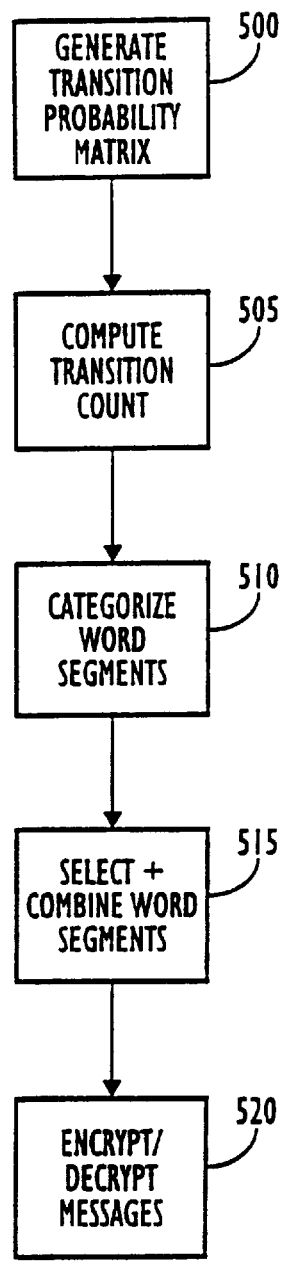
FIG. 5 is a flow diagram depicting a further implementation of the present invention.

FIG. 5 is a flow chart representing another implementation of the invention. In step 500 a transition probability matrix using a second order Markov model is generated for pronounceable word segments, each having four characters. The number of non-zero transitions associated with each trigram in the probability matrix is computed in steps 505. The word segments themselves are categorized in step 510 into the desired number of categories based upon the transition Count [ij] associated with the trigram forming the first three letters of each word segment. In step 515, two word segments from selected categories are selected and combined to form an eight character pronounceable password. The selection of the two word segments is random so that the selection of any of the word segments within the predetermined categories in forming the pronounceable password is of substantially equal probability. The user may, as discussed above, have the ability to select one of a number of generated passwords. The generated password is utilized as indicated in step 520 to encode and decode messages. Thus, common trigrams like "the", "she", "hat", "lap", "wat", etc. can be presented to the users as word segments and used to form good passwords, e.g. wat-she-lap.

Figure 6:
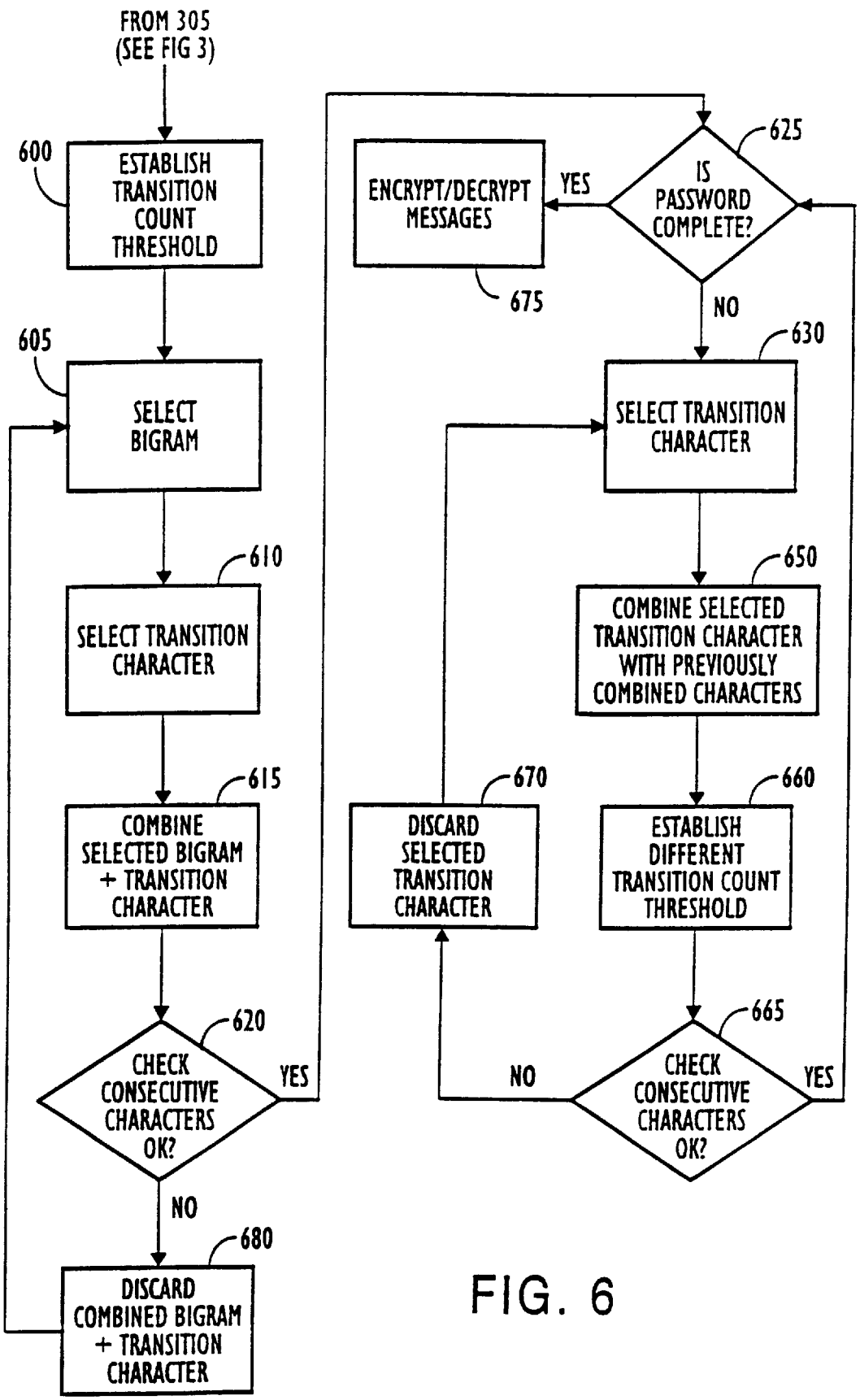
FIG. 6 is a flow diagram depicting a still further implementation of the present invention which utilizes one or more threshold transition values.

FIG. 6 represents a still further implementation of the present invention. The probability matrix and computation of the transition count for the pronounceable word segments is performed as described in steps 300 and 305 of FIG. 3. However, in this particular implementation, the bigrams are not categorized but rather a predetermined transition count threshold is established in step 600. A bigram is randomly selected in step 605 from a set of bigrams within the pronounceable word segments. A transition character which has been used in computing the transition Count [ij] for the selected bigram is randomly selected in step 610. The selected bigram and transition character are combined in step 615. A determination is made in step 620 as to whether or not consecutive characters of the portion of the password generated by combining the bigram and transition character form a bigram which fails to meet the transition threshold established in step 600. If the threshold is not met, the selected bigram and transition character are discarded in step 680 and a substitute bigram and transition character are selected and combined as described in steps 605–615. If the Count [ij] for all bigrams formed by consecutive characters of the generated password portion are acceptable, a determination is made in step 625 as to whether or not the password is of the desired length. If not, another transition character is selected in step 630 based upon the bigram formed by the last two characters of the password portion generated up to this point in step 615. In step 650 the selected transition character is combined with the previously generated portion of the password. In step 760 a second transition count threshold is identified and utilized in step 665 to determine if the bigram formed by the last two characters of the string of characters resulting from the combination of step 650 meets the second threshold requirements. If not, the last character is discarded in step 670 and a substitute character is selected as described above in step 630. If the threshold is met, a determination is made, as discussed in step 625, as to whether or not the password is complete. If not, another selection is made as described in step 630. Once a full string of characters have been selected to complete a pronounceable password, it can be applied as indicated in step 675 to encrypt and decrypt messages.

Figure 7:
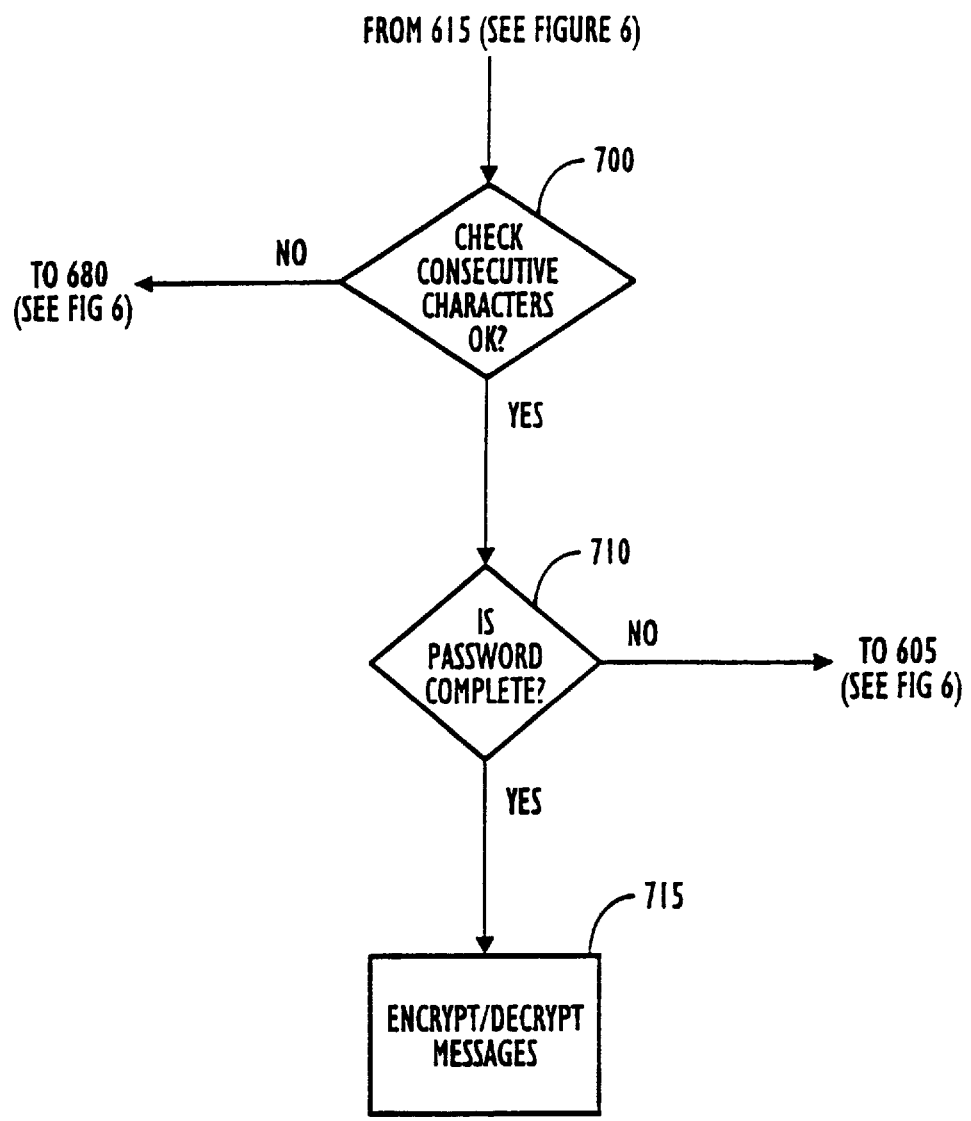
FIG. 7 is a flow diagram depicting yet another implementation of the present invention which is a somewhat modified version of that depicted in FIG. 6.

In a still further implementation of the invention as shown in FIG. 7, rather than developing a string of characters by selecting individual transition characters once a combined selected bigram and associated transition character generated in step 615 of FIG. 6 are determined in step 700 to meet the transition threshold of step 600 of FIG. 6, a determination is made in step 710 as to whether or not the password is complete. If so, it can be applied in the encryption and decryption of messages in step 715. If not another bigram and trigram are selected and combined as described in connection with steps 605 to 615 of FIG. 6. This combination is then combined with the previously generated portion of the password to extend the string of characters to form a pronounceable password of the desired length. As noted earlier, the user may be allowed to select a password from a number of generated passwords.

By increasing or decreasing the size of the dictionary selected to identify pronounceable word segments the Markov model can be varied. Thus, to increase the number of transitions in a Markov model a larger dictionary can be used. Alternatively, to simplify the model a smaller dictionary can be used for identifying pronounceable word segments. The dictionary may be for any language and it should be clear that the present invention can be utilized no matter what language may be of interest to the users.

Figure 8:
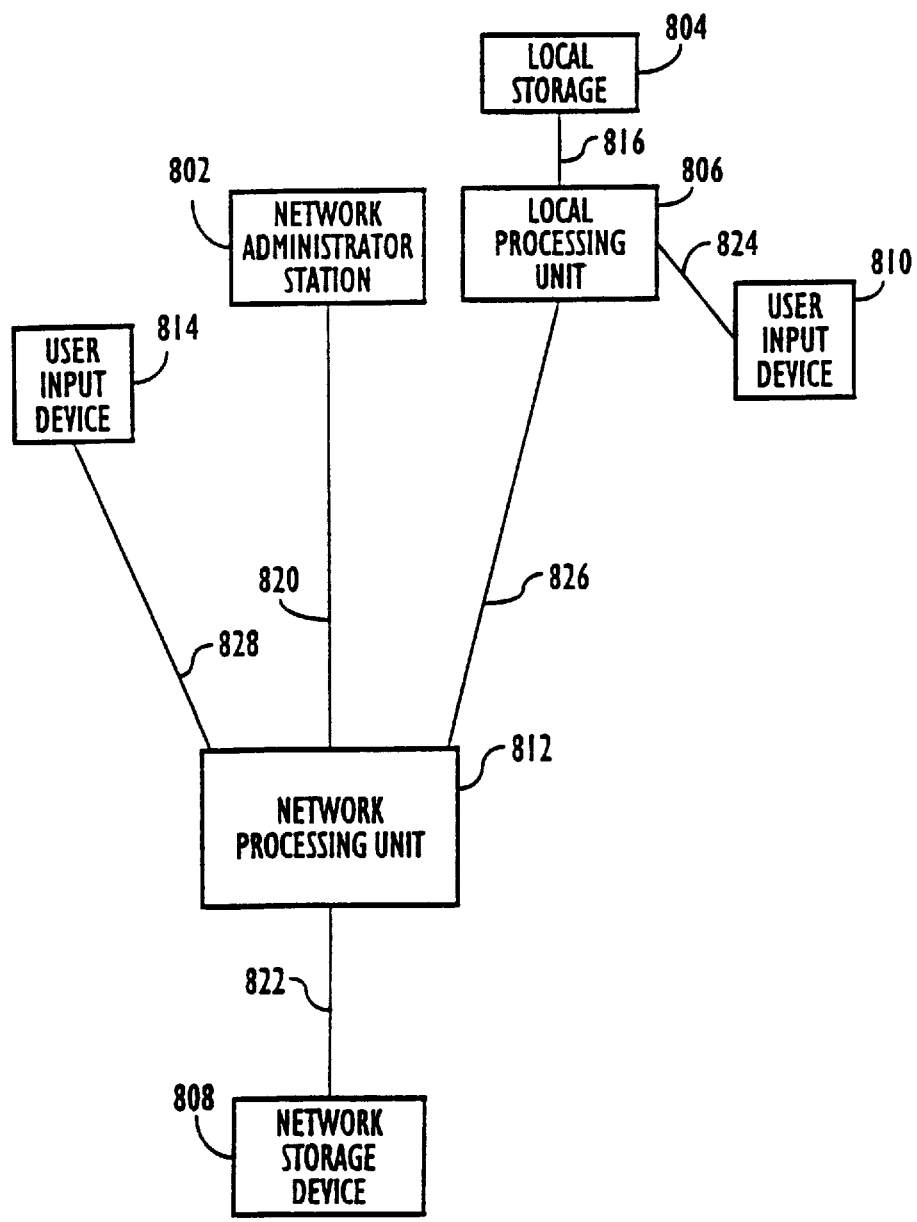
FIG. 8 is a simplified block diagram of an exemplary system according to the present invention.

FIG. 8 is a simplified block diagram representative of a pronounceable password generating system in accordance with the present invention. It will be understood by those skilled in the art that the present invention can be implemented in any number of system configurations and that the system shown in FIG. 8, and hereinafter described, is exemplary of the type of systems encompassed by the present invention.

As shown, an administrator's station 802 is used to access, through interfaces 816, a local storage device 804 via local area network (LAN) communications links 820 and 826 and local processing unit 806. The network administrator's station 802 can also access a network storage device 808 by LAN communications link 820 to the network processing unit 812 and via interface 822 to the network storage device 808. The local processing unit 806 may also be capable of communicating, via LAN link 826, with the network processing unit 812 and from there network storage device 808 via interface 822. A user utilizing the user input device 810, which for example could be a computer keyboard, can access the local processing unit 806 and local storage device 804 via interface 824, and the network processing unit 812 and storage device 808 via LAN link 826. A non-intelligent or "dumb" terminal 814 may also be linked via a LAN link 828 to the network processing unit 812. Such a terminal would normally be considered insecure and subject to eavesdropping.

In a first embodiment of the present invention bigrams which form a portion of pronounceable word segments selected by the administrator are stored on the network storage device 808 and/or, if desired, the local storage device 804. Additionally stored on either or both of devices 804 and 808 are associated unigrams which form the third character in the three character word segments selected by the network administrator for use in generating pronounceable passwords. As discussed above, each of the bigrams has an associated transition number which is likewise stored by the system administrator on the network storage device 808 and/or local storage device 804, as applicable. These transition numbers, as described above, correspond to the number of different unigrams which are included in the selected pronounceable word segments which begin with a particular bigram. As noted earlier, in connection with the description of the various implementations of the method of the present invention, bigrams with zero transition numbers are generally considered illegal and therefore would typically not be stored on storage devices 804 and/or 808.

A user desiring to obtain a pronounceable password can make a request for such a password to be generated via user input device 810 or 814. If the portions of the pronounceable word segments and associated transition number have been stored on the local storage device 804, the processor 806, upon receiving the request from user input device 810, retrieves via interface 816 a first bigram stored in the local storage device 804. Retrieval is random thus the selection of any one of the stored bigrams is of substantially equal probability. In a similar manner the processor retrieves a unigram from the set of unigrams which, when combined with the retrieved bigram, form one of the pronounceable word segments which have been selected by the network administrator. Here too the retrieval is random and therefore the retrieval of any one of the unigrams which may be combined with the retrieved bigram to form one of the selected pronounceable word segment is of substantially equal probability. The bigram and unigram are combined by the local processor 806 to form the first three characters of a pronounceable security password. Also stored on the local storage device 804 by the network administrator are predetermined threshold transition numbers. In this regard, a different transition number threshold is utilized in accordance with the applicable security policy for each round in selecting additional characters to be included in the generated pronounceable password. The number of threshold transition numbers selected will vary depending on the particular system security requirements. Thus, although a particular number of threshold values are indicated herein to be stored in the local and/or network storage devices 804 and 808, as applicable, it should be understood that the network administrator has the discretion to store and utilize as many or as few threshold values as may be deemed appropriate and that a single threshold transition number could be used if so desired.

The processor 810 implements a software routine to determine if consecutive characters of the portion of the pronounceable security password which has been generated are identical to a stored bigram which has an associated transition number below that of the first threshold transition number retrieved by the processor from the local storage device 804 via interface 816. In the case of the three characters formed in the initial selection round, this check entails comparing the stored transition number associated with a stored bigram corresponding to the bigram formed by the last two letters of the generated three character string against the retrieved first threshold transition number. If the transition number associated with the corresponding bigram is less than the retrieved threshold transition number, the selection process is begun anew as described previously. If the generated string meets the required threshold, another unigram is randomly retrieved by processor 810 from the local storage device 804. This unigram is retrieved from a set of unigrams which when combined with the bigram formed by the last two characters of the generated string of characters form another of the pronounceable word segments selected by the network administrator. This latter retrieved unigram is combined by processor 810 with the previously generated three character string to create a further extended portion of the pronounceable password. A transition number associated with a bigram corresponding to the last two characters of the generated four character string is now compared by the processing unit 810 with a second threshold transition number stored, by network administrator, on local storage device 804 and retrieved by local processing unit 806. This second threshold transition number if lower than the first threshold transition number. The processor 806 discards retrieved characters which form bigrams which fail to meet a required threshold. The processor continues to retrieve unigrams as described above until an acceptable eight or nine character pronounceable security password has been generated. In practice, the system would generate multiple pronounceable passwords which are displayed to the user, who then can select one of the displayed generated passwords.

Generation of a pronounceable security password by a user of non-intelligent user input device 814 would be identical to that described above except that the network processing unit 812 would perform the necessary processing using data retrieved from network storage device 808 via interface 812 and would transmit the generated password or passwords to the user via LAN link 828.

In a second embodiment of the system in accordance with the present invention, rather than threshold transition numbers being stored on the local storage device and/or network storage device 804 and 808, the bigrams are stored in categories or with category designations selected by the network administrator based upon each bigram's associated transition number. Thus the processor is directed by the processing software to select bigrams or unigrams associated with bigrams only from certain categories during each round of generating new characters for inclusion in the pronounceable security password. Accordingly, rather than checking transition numbers associated with bigrams corresponding to consecutive characters of the generated string of characters, a check is made to determine if bigrams corresponding to the last two characters of the generated string are within a selected group of categories to determine their acceptability.

In a further embodiment of the system according to the present invention, rather than storing the bigrams and unigrams which form the pronounceable word segments selected by the network administrator, the pronounceable word segments themselves are stored on the local storage device 804 and/or network storage device 808. The stored word segments are categorized based upon the transition number associated with the bigram formed by the first two characters of each of the three character word segments. Thus, as in the second embodiment, the processor retrieves only word segments conforming to predetermined categories which have been selected by the network administrator and included in the processing software. In this embodiment processing unit 806 or 812, having received a request to generate a pronounceable security password, retrieves two word segments from designated categories and combines the two segments to form a six character portion of the pronounceable security password. A third word segment is next retrieved from a larger number of categories of stored word segments and combined with the generated six character string to complete the pronounceable security password.

Figure 10:
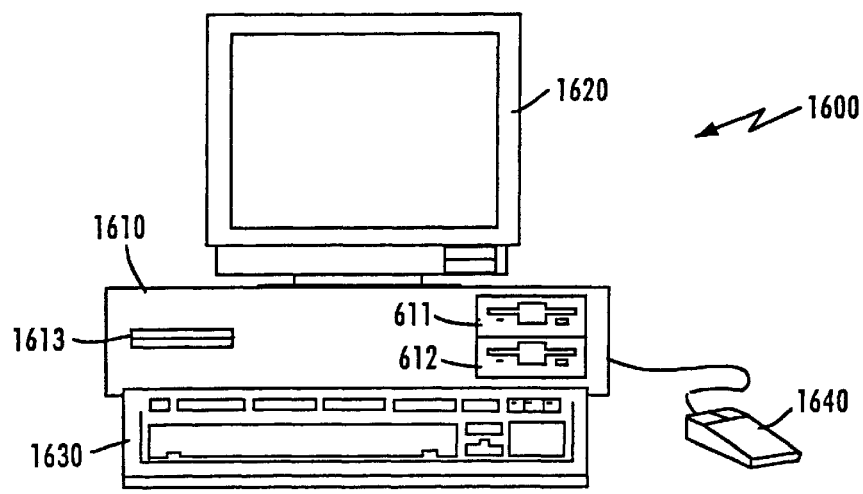
FIG. 10 depicts a computer suitable for use as the network processing unit and storage device shown in FIG. 8.
Figure 11:
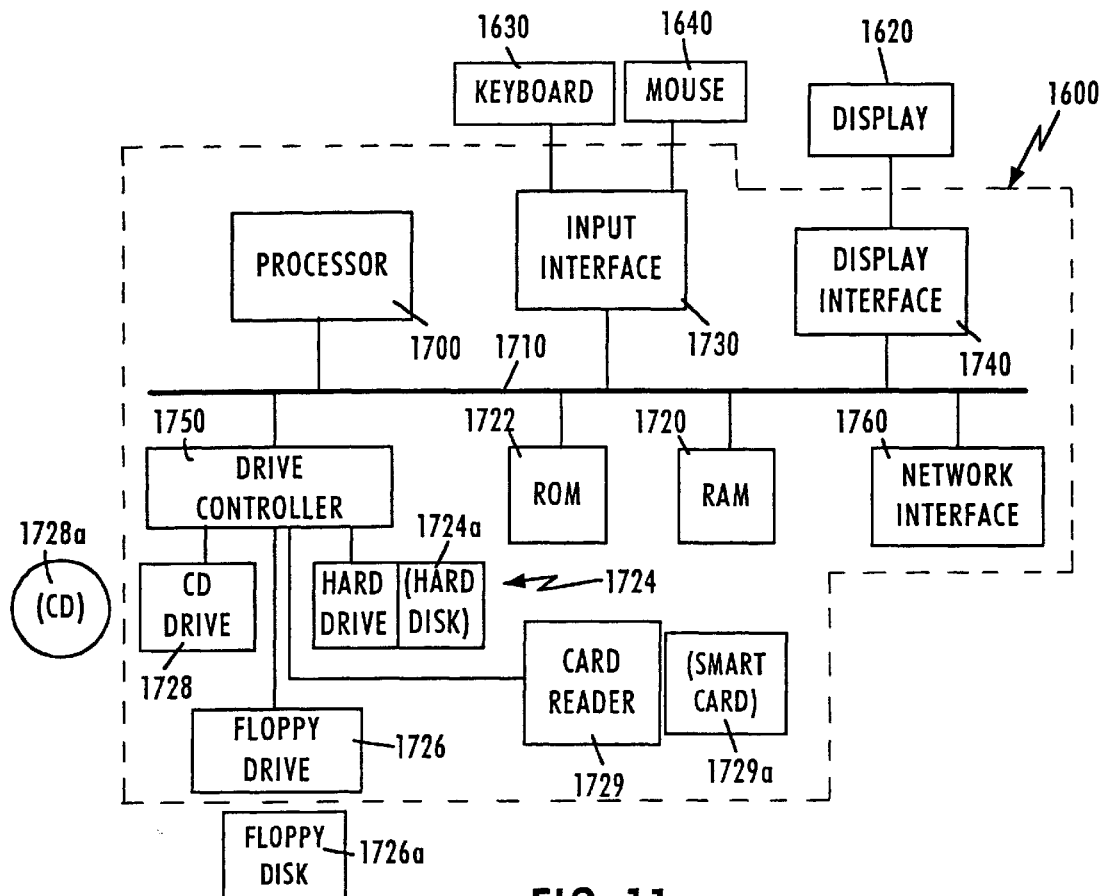
FIG. 11 is a exemplary block diagram of the computer depicted in FIG. 10.

FIGS. 10–11 depict a computer suitable for use as the network processing unit 812 and network storage device 808 shown in FIG. 8. The computer is preferably a commercially available personal computer or high-powered work station. The computer's processor could, for example, be a Pentium™ processor. Any commercially available keyboard and/or mouse and monitor can be utilized. A high-speed network interface, including a high-speed modem, is preferred although not mandatory. The depicted configuration of the computer is exemplary. The computer could, if desired, also or alternatively include other components (not shown), such as an optical storage medium. Any number configurations could be suitable for implementing the invention so long as sufficient storage capacity and processing capability are provided.

The computer is uniquely driven to operate in accordance with the present invention. That is, the functionality of the computer depicted in FIGS. 10–11 varies from that of the other computers due to the programming instructions which drive its operation. It will also be recognized by those skilled in the art that only routine programming is required to implement the instructions disclosed herein on the described computer such that the computer is driven by the programming to operate in accordance with the invention.

The computer depicted in FIGS. 10–11 will be described below. Since the computer components and configurations are conventional, routine operations performed by the depicted components will generally not be described, such operations being well understood in the art.

Preferably, the computer stores its unique programming instructions on its ROM or hard disk. Long term data which may be stored are preferably stored on the computer's hard disk. Short term data which is required to be processed or otherwise utilized more than once is preferably stored on the RAM.

Referring now to FIGS. 10 and 11, the computer 1600 includes a main unit 1610 with slots 1611, 1612 and 1613, respectively provided for loading programming or data from a floppy disc 1726*a*, CD 1728*a* and smart card 1729*a* onto the computer 1600. The computer 1600 also includes a keyboard 1630 and mouse 1640 which serve as user input devices. A monitor display 1620 is also provided to visually communicate information to the user.

As depicted in FIG. 11, The computer 1600 has a main processor 1700 which is interconnected via bus 1710 with various storage devices including RAM 1720, ROM 1722 and hard drive 1724, all of which serve as a storage medium on which computer programming or data can be stored for access by the processor 1700. The main processor 1700 is also interconnected via bus 1710 with various other storage devices such as the floppy disc drive 1726, the CD drive 1728 and the card reader 1729 which are capable of being controlled by drive controller 1750 to read computer programming or data stored on a floppy disc 1726*a*, CD 1728*a* or smart card 1729*a* when inserted into the appropriate slot 1611, 1612 or 1613 in the unit 1610. By accessing the stored computer programming the processor 1700 is driven to operate in accordance with the present invention.

The processor 1700 is also operatively connected to the keyboard 1630 and/or mouse 1640, via input interface 1730. The display monitor 1620 is also interconnected to the processor 1700, via display interface 1740, to facilitate the display of information to the user. The network interface 1760 is provided to interconnect the processor 1700 to the communication links 820, 826 and 828 depicted in FIG. 8 and accordingly allow communications between the computer 1600 and other network devices. Since the computer 1600 serves as the network processing unit 812 of FIG. 8, the network interface allows communications with network devices 802, 806, 810 and 814 of FIG. 8.

The interoperation of the various components of the computer depicted in FIGS. 10 and 11 in implementing the steps described with reference to FIGS. 3–7 are as previously described with the processor 1700 serving as the network processing unit 812, the hard disk 1724*a* storing the word segments, word segment portions, transition number thresholds, and selection categories, as applicable. As previously discussed, the word segments or word segment portions may be stored on the hard disk 1724*a* in categories or may have category designations stored in association with the applicable word segment or word segment portion. The programming instructions are preferably stored on the ROM 1722*a*, but could be stored elsewhere. Password parts and portions will typically be temporarily stored on RAM 1720. It will be understood by those skilled in the art that other storage devices depicted in FIGS. 10–11 could be alternatively utilized if desired for storage of some or all of the aforementioned information. The bus 1710 serves as the interface 822 shown in FIG. 8.

As described, the present invention provides an computer and computer programming for generating pronounceable passwords which provide greater security than conventional techniques. Pronounceable passwords are generated which require that an attacker perform a more exhaustively search to uncover one or more of the passwords, thereby providing increased security for a user account. The pronounceable passwords which are generated are not subject to a smallest bucket attack. Using the inventive computer or computer programming, secure, pronounceable passwords, which are user friendly, can be generated quickly and easily.

I claim:

1. An article of manufacture for forming a pronounceable security password using a plurality of first word segment portions and a plurality of second word segment portions, with each of said plurality of first word segment portions having (i) an associated set of one or more said second word segment portions, each said second word segment portion within said associated set being different from others within said set and being combinable with said associated first word segment portion to form a pronounceable word segment and (ii) a transition number corresponding to the number of said second word segment portions within the associated set of second word segment portions, comprising:

computer readable storage medium; and computer programming stored on said storage medium;

wherein said stored computer programming is configured to be readable from said computer readable storage medium by a computer and thereby cause said computer to operate so as to:

select a first one of said plurality of first word segment portions, wherein selection of any one of said plurality of first word segment portions is of substantially equal probability;

select a first one of said plurality of second word segment portions from said set of second word segment portions associated with said selected first word segment portion, wherein selection of any one of said second word segment portions within said associated set of second word segment portions is of substantially equal probability;

combine said selected first word segment portion and said selected second word segment portion to form a first pronounceable word segment;

determine if consecutive characters of said first pronounceable word segment are unacceptable due to their correspondence to those of said plurality of first word segment portions having a transition number less than a first threshold transition number; and generate a pronounceable security password of eight or more characters including said first pronounceable word segment only if consecutive characters of said first pronounceable word segment are determined to be acceptable.

2. An article of manufacture for forming a pronounceable security password according to claim 1, wherein said stored computer programming is configured to be readable from said computer readable storage medium by the computer to thereby cause said computer to operate so as to:

discard said first pronounceable word segment if the consecutive characters are determined to be unacceptable;

select a second one of said plurality of first word segment portions, wherein selection of any one of said plurality of first word segment portions is of substantially equal probability;

select a second one of said plurality of second word segment portions from the set of second word segment portions associated with said second selected first word segment portion, wherein selection of any one of said second word segment portions within said associated set of second word segment portions is of substantially equal probability;

combine said second selected first word segment portion and said second selected second word segment portion to form a substitute first pronounceable word segment;

determine if consecutive characters of said substitute first pronounceable word segment are unacceptable due to their correspondence to those of said plurality of first word segment portions having a transition number less than the first threshold transition number; and generate a pronounceable security password of eight or more characters including said substitute first pronounceable word segment only if consecutive characters of said substitute first pronounceable word segment are determined to be acceptable.

3. An article of manufacture for forming a pronounceable security password according to claim 1, wherein said selected first word segment portion is a bigram or a trigram.

4. An article of manufacture for forming a pronounceable security password according to claim 1, wherein said stored computer programming is configured to be readable from said computer readable storage medium by the computer to thereby cause said computer to operate so as to:

identify a first word segment portion, within said plurality of first word segment portions, corresponding to one or more characters at an end portion of said first pronounceable word segment;

select a second one of said plurality of second word segment portions from the set of second word segment portions associated with said corresponding first word segment portion, wherein selection of any one of said second word segment portions within said associated set of second word segment portions is of substantially equal probability;

combine said first pronounceable word segment with said second selected second word segment portion to form a part of the password; and determine if consecutive characters of the formed password part are unacceptable due to their correspondence to those of said plurality of first word segment portions having a transition number less than a second threshold transition number;

wherein the generated pronounceable security password includes said second selected second word segment only if the consecutive characters of the password part are determined to be acceptable.

5. An article of manufacture for forming a pronounceable security password according to claim 4, wherein said second threshold transition number is different than said first threshold transition number.

6. An article of manufacture for forming a pronounceable security password according to claim 1, wherein said stored computer programming is configured to be readable from said computer readable storage medium by the computer to thereby cause said computer to operate so as to:

select a second one of said plurality of first word segment portions, wherein selection of any one of said plurality of first word segment portions is of substantially equal probability;

select a second one of said second word segment portions from the set of second word segment portions associated with said second selected first word segment portion, wherein selection of any one of said second word segment portions within said associated set of second word segment portions is of substantially equal probability;

combine said second selected first word segment portion and said second selected second word segment portion to form a second pronounceable word segment;

combine said first pronounceable word segment with said second pronounceable word segment to form at least a part of the password; and determine if consecutive characters of the formed password part are unacceptable due to their correspondence to those of said plurality of first word segment portions having a transition number less than a second threshold transition number;

wherein the generated pronounceable security password includes said second pronounceable word segment only if consecutive characters of the formed password part are determined to be acceptable.

7. An article of manufacture for forming a pronounceable security password according to claim 6, wherein said second threshold transition number is different than said threshold transition number.

8. An article of manufacture for forming a pronounceable security password according to claim 6, wherein said stored computer programming is configured to be readable from said computer readable storage medium by the computer to thereby cause said computer to operate so as to:

discard said second pronounceable word segment if consecutive characters of the formed password part are determined to be unacceptable;

select a third one of said plurality of first word segment portions, wherein selection of any one of said plurality of first word segment portions is of substantially equal probability;

select a third one of said plurality of second word segment portions from the set of second word segment portions associated with said third selected first word segment portion, wherein selection of any one of said second word segment portions within said associated set of second word segment portions is of substantially equal probability;

combine said third selected first word segment portion and said third selected second word segment portion to form a substitute second pronounceable word segment;

combine said first pronounceable word segment and said substitute second pronounceable word segment to form a substitute part of the password; and determine if consecutive characters of the substitute password part are unacceptable due to their correspondence to those of said plurality of first word segment portions having a transition number less than the second threshold transition number;

wherein the generated pronounceable security password includes said substitute second pronounceable word segment only if the consecutive characters of the substitute password part are determined to be acceptable.

9. An article of manufacture for forming a pronounceable security password according to claim 1, wherein said stored computer programming is configured to be readable from said computer readable storage medium by the computer to thereby cause said computer to operate so as to:

apply said pronounceable security password to encrypt or decrypt a message.

10. An article of manufacture for forming a pronounceable security password using a plurality of first word segment portions and a plurality of second word segment portions, each of said plurality of first word segment portions having an associated set of one or more said second word segment portions and being categorized into one of at least two categories based upon a transition number corresponding to the number of said second word segment portions within the associate set of second word segment portions, and each said second word segment portion within said associated set being different from others within said set and being combinable with said associated first word segment portion to form a pronounceable word segment comprising:

computer readable storage medium; and computer programming stored on said storage medium;

wherein said stored computer programming is configured to be readable from said computer readable storage medium by a computer and thereby cause said computer to operate so as to:

select a first one of said plurality of first word segment portions categorized within one or more categories selected from said at least two categories, wherein the transition number associated with each of said first word segment portions categorized within said selected categories equals or exceeds a first threshold transition value and selection of any one of said plurality of first word segment portions categorized within said selected categories is of substantially equal probability;

select a first one of said plurality of second word segment portions from the set of second word segment portions associated with the selected first word segment portion, wherein selection of any one of said second word segment portions within said associated set of second word segment portions is of substantially equal probability;

combine said selected first word segment portion and said selected second word segment portion to form a first pronounceable word segment;

determine if consecutive characters of said first pronounceable word segment are unacceptable due to their correspondence to those of said plurality of first word segment portions categorized in a non-selected category; and generate a pronounceable security password of eight or more characters and including said first pronounceable word segment only if the consecutive characters of the first pronounceable word segment are determined to be acceptable.

11. An article of manufacture for forming a pronounceable security password according to claim 10, wherein the transition number associated with each of said first word segment portions categorized within said selected categories is higher than the transition number associated with each of said first word segment portions categorized in a non-selected category.

12. An article of manufacture for forming a pronounceable security password according to claim 11, wherein said stored computer programming is configured to be readable from said computer readable storage medium by the computer to thereby cause said computer to operate so as to:

discard said first selected second word segment portion if the consecutive characters of said first pronounceable word segment portion are determined to be unacceptable;

select a second one of said plurality of second word segment portions from the set of second word segment portions associated with the selected first word segment portion, wherein selection of any one of said second word segment portions within said associated set of second word segment portions is of substantially equal probability;

combine said selected first word segment portion and said second selected second word segment portion to form a substitute first pronounceable word segment;

determine if consecutive characters of said substitute first pronounceable word segment are unacceptable due to their correspondence to those of said plurality of first word segment portions categorized in a non-selected category; and generate a pronounceable security password of eight or more characters and including said substitute first pronounceable word segment only if consecutive characters of the substitute first pronounceable word segment are determined to be acceptable.

13. An article of manufacture for forming a pronounceable security password according to claim 10, wherein said stored computer programming is configured to be readable from said computer readable storage medium by the computer to thereby cause said computer to operate so as to:

identify a first word segment portion, within said plurality of first word segment portions categorized in said selected categories and corresponding to consecutive characters at an end portion of said first pronounceable word segment;

select a second of said plurality of second word segment portions from the set of second word segment portions associated with said corresponding first word segment portion, wherein selection of any one of said second word segment portions within said associated set of second word segment portions is of substantially equal probability;

combine said first pronounceable word segment with said second selected second word segment portion to form a part of said password; and determine if consecutive characters of said formed password part are unacceptable due to their correspondence to those of said plurality of first word segment portions categorized in a non-selected category, wherein the generated pronounceable security password includes said selected other second word segment portion only if the consecutive characters of the formed password part are determined to be acceptable.

14. An article of manufacture for forming a pronounceable security password according to claim 10, wherein said stored computer programming is configured to be readable from said computer readable storage medium by the computer to thereby cause said computer to operate so as to:

select a second one of said plurality of first word segment portions categorized within said selected categories, wherein selection of any one of said first word segment portions categorized within said one or more selection categories is of substantially equal probability;

select a second one of said plurality of second word segment portions from the set of second word segment portions associated with the second selected first word segment portion, wherein selection of any one of said second word segment portions within said associated set of second word segment portions is of substantially equal probability;

combine said second selected first word segment portion and said second selected second word segment portion to form a second pronounceable word segment;

combine said first pronounceable word segment with said second pronounceable word segment to form a portion of said password; and determine if consecutive characters of said formed password portion are unacceptable due to their correspondence to those of said plurality of first word segment portions categorized in a non-selected category;

wherein the generated pronounceable security password includes said second pronounceable word segment portion only if consecutive characters of the formed password portion are determined to be acceptable.

15. An article of manufacture for forming a pronounceable security password according to claim 14, wherein said stored computer programming is configured to be readable from said computer readable storage medium by the computer to thereby cause said computer to operate so as to:

discard said second pronounceable word segment if the consecutive characters of the formed password portion are determined to be unacceptable;

select a third one of said plurality of first word segment portions categorized within said selected categories, wherein selection of any one of said first word segment portions categorized within said selected categories is of substantially equal probability;

select a third one of said plurality of second word segment portions from the set of second word segment portions associated with the third selected first word segment portion, wherein selection of any one of said second word segment portions within said associated set of second word segment portions is of substantially equal probability;

combine said third selected first word segment portion and said third selected second word segment portion to form a substitute second pronounceable word segment;

combine said first pronounceable word segment and said substitute second pronounceable word segment to form a substitute portion of said password; and determine if consecutive characters of said formed substitute password portion are unacceptable due to their correspondence to those of said plurality of first word segment portions categorized in a non-selected category, wherein the generated pronounceable security password includes said substitute second pronounceable word segment only if consecutive characters of the formed substitute password are determined to be acceptable.

16. An article of manufacture for forming a pronounceable security password according to claim 10, wherein the selected first word segment portion is a bigram or a trigram.

17. An article of manufacture for forming a pronounceable security password using a plurality of pronounceable word segments, each of said plurality of word segments including a first portion and a second portion and being categorized into one of at least two categories based upon a transition number corresponding to the number of different said second portions included in those of said plurality of word segments which have a first portion identical to the first portion of the word segment being categorized, comprising:

computer readable storage medium; and computer programming stored on said storage medium;

wherein said stored computer programming is configured to be readable from said computer readable storage medium by a computer and thereby cause said computer to operate so as to:

select at least two of said word segments categorized within one or more categories selected from said at least two categories, wherein the transition number associated with each of said word segment portions categorized within said selected categories equals or exceeds a first threshold transition number and the probability of selection of any one of said word segments categorized within said selected categories is substantially equal; and combine said selected word segments to form a portion of said pronounceable security password;

determine if consecutive characters of said formed pronounceable security password portion are unacceptable based upon their correspondence to those of said plurality of first word segment portions categorized in a non-selected category; and generate a pronounceable security password of eight or more characters and including said formed pronounceable security password portion only if the consecutive characters of said pronounceable security password portion are determined to be acceptable.

18. An article of manufacture for forming a pronounceable security password according to claim 17, wherein the transition number associated with each said word segment categorized in said selected categories is higher than the transition number associated with each said word segment categorized in a non-selected category.

19. An article of manufacture for generating a pronounceable security password comprising:

computer readable storage medium; and computer programming stored on said storage medium;

wherein said stored computer programming is configured to be readable from said computer readable storage medium by a computer and thereby cause said computer to operate so as to:

divide each of a plurality of pronounceable word segments into a first portion having at least one character and a second portion having at least one character;

determine a probability of transition of each of said first portions to one or more of said second portions to form one of the pronounceable word segments;

randomly select one of said first portions from those of said first portions having a probability of transition less than a threshold;

randomly select one of said second portions from those of said second portions combinable with said selected first portion to form one of said pronounceable word segments;

combine said selected first and said selected second portions to form one of said pronounceable word segments;

determine if consecutive characters of said formed pronounceable word segment are unacceptable based upon their correspondence to those of said first portions which have an associated probability of transition which is greater than the selected threshold; and generate a pronounceable security password including said pronounceable word segment only if consecutive characters of said formed pronounceable word segment are determined to be acceptable.

20. A article of manufacture for generating a pronounceable security password according to claim 19, wherein said stored computer programming is configured to be readable from said computer readable storage medium by the computer to thereby cause said computer to operate so as to:

categorize said first portions into multiple categories based upon said probability of transition; and randomly select the selected first portion only from said first portions categorized within selected of said categories.

21. An article of manufacture for generating a pronounceable security password according to claim 19, wherein said probability of transition is determined using a second or third order Markov model.

22. A programmed computer for forming a pronounceable security password, comprising:

storage medium having stored (i) a plurality of first word segment portions, (ii) a plurality of second word segment portions, each second word segment portion being within one or more sets of second word segment portions with each of said sets being associated with one first word segment portion and each second word segment portion within a particular associated set being different from others within said particular associated set and being combinable with the associated first word segment portion to form a pronounceable word segment and (iii) a plurality of transition numbers each associated with one or more of the plurality of first word segment portions and corresponding to the number of said second word segment portions within the associate set of second word segment portions;

a processor configured to (i) select a first one of said plurality of first word segment portions, wherein selection of any one of said plurality of first word segment portions is of substantially equal probability, (ii) select a first one of said plurality of second word segment portions from said set of second word segment portions associated with said selected first word segment portion, wherein selection of any one of said second word segment portions within said associated set of second word segment portions is of substantially equal probability, (iii) combine said selected first word segment portion and said selected second word segment portion to form a first pronounceable word segment, (iv) determine if consecutive characters of said first pronounceable word segment are unacceptable based upon their correspondence to those of said plurality of first word segment portions having a transition number less than a first threshold transition number, and (v) generate a pronounceable security password of eight or more characters and including said first pronounceable word segment only if the consecutive characters of said first pronounceable word segment are determined to be acceptable.

23. A programmed computer for forming a pronounceable security password according to claim 22, wherein said processor is configured to:

discard said first pronounceable word segment if the consecutive characters of the first pronounceable word segment are determined to be unacceptable, select a second one of said plurality of first word segment portions, wherein selection of any one of said plurality of first word segment portions is of substantially equal probability, select a second one of said plurality of second word segment portions from the set of second word segment portions associated with said second selected first word segment portion, wherein selection of any one of said second word segment portions within said associated set of second word segment portions is of substantially equal probability, combine said second selected first word segment portion and said second selected second word segment portion to form a substitute first pronounceable word segment, determine if consecutive characters of said substitute first pronounceable word segment are unacceptable based upon their correspondence to those of said plurality of first word segment portions having a transition number less than the first threshold transition number, and generate a pronounceable security password including said substitute first pronounceable word segment only if consecutive characters of the substitute first pronounceable word segment are determined to be acceptable.

24. A programmed computer for forming a pronounceable security password according to claim 22, wherein said processor is configured to:

identify a first word segment portion, within said plurality of first word segment portions, corresponding to one or more characters at an end portion of said first pronounceable word segment;

select a second one of said plurality of second word segment portions from the set of second word segment portions associated with said corresponding first word segment portion, wherein selection of any one of said second word segment portions within said associated set of second word segment portions is of substantially equal probability, combine said first pronounceable word segment with said second selected second word segment portion to form a part of the password, and determine if consecutive characters of said password part are unacceptable based upon their correspondence to those of said plurality of first word segment portions having a transition number less than a second threshold transition number, wherein the generated pronounceable security password includes said second selected second word segment only if consecutive characters of the password part are determined to be acceptable.

25. A programmed computer for forming a pronounceable security password according to claim 24, wherein said second threshold transition number is different than said first threshold transition number.

26. A programmed computer for forming a pronounceable security password according to claim 22, wherein said processor is configured to:

select a second one of said plurality of first word segment portions, wherein selection of any one of said plurality of first word segment portions is of substantially equal probability, select a second one of said second word segment portions from the set of second word segment portions associated with said second selected first word segment portion, wherein selection of any one of said second word segment portions within said associated set of second word segment portions is of substantially equal probability, combine said second selected first word segment portion and said second selected second word segment portion to form a second pronounceable word segment, combine said first part of the password with said second part of the password to form a portion of the password, and determine if consecutive characters of said password portion are unacceptable based upon their correspondence to those of said plurality of first word segment portions having a transition number less than a second threshold transition number, wherein the generated pronounceable security password includes said second pronounceable word segment only if the consecutive characters of the password portion are determined to be acceptable.

27. A programmed computer for forming a pronounceable security password according to claim 26, wherein said second threshold transition number is different than said threshold transition number.

28. A programmed computer for forming a pronounceable security password according to claim 22, wherein:

said selected first word segment portion is a bigram or a trigram, said processor is configured to apply said pronounceable security password to encrypt or decrypt a message, and said storage medium has said first threshold value stored thereon.

29. A programmed computer for forming a pronounceable security password, comprising:

storage medium having stored (i) a plurality of first word segment portions, each being categorized into one of a plurality of categories based upon a transition number corresponding to the number of different second word segment portions within an associated set of second word segment portions formed from a plurality of second word segment portions which are combinable with the associated first word segment portion to form a pronounceable word segment, and (ii) the plurality of second word segment portions; and a processor configured to (i) select a first one of said plurality of first word segment portions categorized within a selected one or more of said plurality of categories, wherein the transition number associated with each of said first word segment portions categorized within said one or more selected categories equals or exceeds a first threshold transition value and selection of any one of said plurality of first word segment portions categorized within said one or more selected categories is of substantially equal probability, (ii) select a first one of said plurality of second word segment portions from the set of second word segment portions associated with the selected first word segment portion, wherein selection of any one of said second word segment portions within said associated set of second word segment portions is of substantially equal probability, (iii) combine said selected first word segment portion and said selected second word segment portion to form a first pronounceable word segment, (iv) determine if consecutive characters of said first pronounceable word segment are unacceptable based upon their correspondence to those of said plurality of first word segment portions categorized in a non-selected category, and (v) generate a pronounceable security password of eight or more characters including said first pronounceable word segment only if the consecutive characters of the first pronounceable word segment are determined to be acceptable.

30. A programmed computer for forming a pronounceable security password according to claim 29, wherein the transition number associated with each of said first word segment portions categorized within said one or more selected categories is higher than the transition number associated with each of said first word segment portions categorized in non-selected categories.

31. A programmed computer for forming a pronounceable security password according to claim 29, wherein said processor is configured to:

discard said first selected second word segment portion if the consecutive characters of said first pronounceable word segment portion are determined to be unacceptable, select a second one of said plurality of second word segment portions from the set of second word segment portions associated with the selected first word segment portion, wherein selection of any one of said second word segment portions within said associated set of second word segment portions is of substantially equal probability, combine said selected first word segment portion and said second selected second word segment portion to form a substitute first pronounceable word segment, determine if consecutive characters of said substitute first pronounceable word segment are unacceptable based upon their correspondence to those of said plurality of first word segment portions categorized in a non-selected category, and wherein the generated pronounceable security password includes said substitute first pronounceable word segment only if the consecutive characters of the substitute first pronounceable word segment are determined to be acceptable.

32. A programmed computer for forming a pronounceable security password according to claim 29, wherein said processor is configured to:

identify a first word segment portion within said plurality of first word segment portions categorized in said one or more selected categories and corresponding to consecutive characters at an end portion of said first pronounceable word segment, select a second of said plurality of second word segment portions from the set of second word segment portions associated with said corresponding first word segment portion, wherein selection of any one of said second word segment portions within said associated set of second word segment portions is of substantially equal probability;

combine said first pronounceable word segment with said second selected second word segment portion to form a part of said password; and determine if consecutive characters of said formed password part are unacceptable based upon their correspondence to those of said plurality of first word segment portions categorized in a non-selected category, wherein the generated pronounceable security password includes said second selected second word segment portion only if the consecutive characters of the formed password part are determined to be acceptable.

33. A programmed computer for forming a pronounceable security password according to claim 29, wherein said processor is configured to:

select a second one of said plurality of first word segment portions categorized within a second selected one or more of said plurality of categories, wherein the transition number associated with each of said first word segment portions categorized within said one or more second selected categories equals or exceeds a second threshold transition value and selection of any one of said first word segment portions categorized within said one or more selection categories is of substantially equal probability;

select a second one of said plurality of second word segment portions from the set of second word segment portions associated with the second selected first word segment portion, wherein selection of any one of said second word segment portions within said associated set of second word segment portions is of substantially equal probability;

combine said second selected first word segment portion and said second selected second word segment portion to form a second pronounceable word segment;

combine said first pronounceable word segment with said second pronounceable word segment to form a portion of said password; and determine if consecutive characters of said password portion are unacceptable based upon their correspondence to those of said plurality of first word segment portions categorized in a non-selected category;

wherein the generated pronounceable security password includes said second pronounceable word segment only if the consecutive characters of the password portion are determined to be acceptable.

34. A programmed computer for forming a pronounceable security password according to claim 33, wherein the second threshold transition value is less than the first threshold transition value and the storage medium stores a parameter corresponding to the first selected categories and the second selected categories.

35. A programmed computer for forming a pronounceable security password according to claim 29, wherein each of the plurality of first word segment portions is a bigram or a trigram.

36. A programmed computer for forming a pronounceable security password using a plurality of pronounceable word segments, comprising:

storage medium having stored (i) a plurality of word segments each having first and second portions and being categorized into one of a plurality of categories based upon a transition number corresponding to the number of different second portions included in those of said plurality of word segments which have a first portion identical to the first portion of the word segment being categorized; and a processor configured to (i) select at least two of said word segments categorized within one or more categories selected from said plurality of categories, wherein the transition number associated with each of said word segment portions categorized within said selected categories equals or exceeds a first threshold transition number and the probability of selection of any one of said word segments categorized within said selected categories is substantially equal, (ii) combine said selected word segments to form a portion of said pronounceable security password, (iii) determine if consecutive characters of said pronounceable security password portion are unacceptable based upon their correspondence to those of said plurality of first word segment portions categorized in a non-selected category, and (iv) generate a pronounceable security password of eight or more characters and including said pronounceable security password portion only if the consecutive characters of said pronounceable security password portion are determined to be acceptable.

37. A programmed computer for forming a pronounceable security password according to claim 36, wherein the transition number associated with each said word segment categorized in said selected one or more categories is higher than the transition number associated with each said word segment categorized in a non-selected category.

38. A programmed computer for forming a pronounceable security password comprising:

a processor configured to (i) divide each of a plurality of pronounceable word segments into a first portion having at least one character and a second portion having at least one character, (ii) determine a probability of transition from each said first portion to one or more of said second portions to form the pronounceable word segments, (iii) randomly select one of said first portions from those of said first portions having a probability of transition equal to or less than a threshold, for use in the pronounceable security password, (iv) randomly select one of said second portions from those of said second portions combinable with said selected first portion to form one of said pronounceable word segments, (v) combine said selected first and said selected second portions to form one of said pronounceable word segments, (vi) determine if consecutive characters of said formed pronounceable word segment are acceptable based upon their correspondence to those of said first portions which have an associated probability of transition which is greater than the threshold, and (vii) generate a pronounceable security password including said pronounceable word segment only if consecutive characters of the formed pronounceable word segment are determined to be acceptable; and storage medium configured to store said first portions and said second portions.

39. A programmed computer for generating a pronounceable security password according to claim 38, wherein said processor is configured to:

categorize said first portions into a plurality of categories based upon said probabilities of transition; and randomly select the selected first portion only from those of said first portions categorized within selected of said categories.

40. An programmed computer for generating a pronounceable security password according to claim 38, wherein said probability of transition is determined using a second or third order Markov model.

* * * * *